(12) United States Patent
Zahrte, Sr. et al.

(10) Patent No.: US 6,266,260 B1
(45) Date of Patent: Jul. 24, 2001

(54) INVERTER HAVING CENTER SWITCH AND UNINTERRUPTIBLE POWER SUPPLY IMPLEMENTING SAME

(75) Inventors: Donald K. Zahrte, Sr., Necedah; David L. Layden, New Lisbon; Frederick A. Stich, Wisconsin Rapids; Douglas C. Folts, Baraboo, all of WI (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/653,383

(22) Filed: Sep. 1, 2000

Related U.S. Application Data
(60) Provisional application No. 60/152,472, filed on Sep. 3, 1999.

(51) Int. Cl.[7] .................................................. H02M 7/5387
(52) U.S. Cl. ................................................................. 363/132
(58) Field of Search ........................... 363/16, 17, 56.02, 363/97, 98, 131, 132

(56) References Cited

U.S. PATENT DOCUMENTS

| | | | |
|---|---|---|---|
| 4,405,893 | 9/1983 | Rance | 323/271 |
| 4,542,451 | 9/1985 | Hucker | 363/132 |
| 4,823,247 | 4/1989 | Tamoto | 363/16 |
| 4,935,861 | 6/1990 | Johnson, Jr. et al. | 363/132 |
| 4,980,812 | 12/1990 | Johnson, Jr. et al. | 363/44 |
| 5,017,800 | 5/1991 | Divan | 307/66 |
| 5,045,989 | 9/1991 | Higaki et al. | 363/37 |
| 5,099,410 | 3/1992 | Divan | 363/98 |
| 5,126,585 | 6/1992 | Boys | 307/66 |
| 5,229,930 | * 7/1993 | Makimaa | 363/132 |
| 5,253,157 | 10/1993 | Severinsky | 363/98 |
| 5,291,383 | 3/1994 | Oughton | 363/17 |
| 5,315,497 | 5/1994 | Severinsky | 363/34 |
| 5,424,936 | 6/1995 | Reddy | 363/97 |
| 5,434,769 | 7/1995 | Severinsky | 363/61 |
| 5,440,179 | 8/1995 | Severinsky | 307/66 |
| 5,469,350 | 11/1995 | Nishio et al. | 363/55 |
| 5,519,306 | 5/1996 | Itoh et al. | 323/222 |
| 5,610,805 | 3/1997 | Gupta | 363/37 |
| 5,654,591 | 8/1997 | Mabboux et al. | 307/66 |
| 5,666,255 | 9/1997 | Muelleman | 361/111 |
| 5,684,686 | 11/1997 | Reddy | 363/97 |
| 5,729,120 | * 3/1998 | Stich et al. | 323/237 |
| 5,764,494 | * 6/1998 | Schutten et al. | 363/17 |
| 5,764,500 | * 6/1998 | Matos | 363/132 |

* cited by examiner

*Primary Examiner*—Matthew Nguyen
(74) *Attorney, Agent, or Firm*—Leydig, Voit & Mayer, Ltd.

(57) ABSTRACT

Presented is a center switching circuit and an inverter and an uninterruptible power supply (UPS) utilizing same. The center switching circuit selectively enables and disables power flow to and from the bus capacitors of an inverter or UPS. As such, the center switching circuitry effectively removes the bus capacitors from the circuit. This allows operation of the inverter or UPS in a high efficiency mode whereby input line voltage may be passed essentially without compensation to the output when the center switching circuit is open. Modulation of the center switching circuit during this mode provides soft charging of the bus capacitors so that they are available to source current in a double-conversion or DC boost mode upon degradation or loss of the line voltage. To supply output power from the bus capacitors, the center switching circuit is closed to associate these capacitors with the neutral. Fault isolation is provided during operation by opening the center switching circuit to prevent power flow from the bus capacitors.

35 Claims, 18 Drawing Sheets

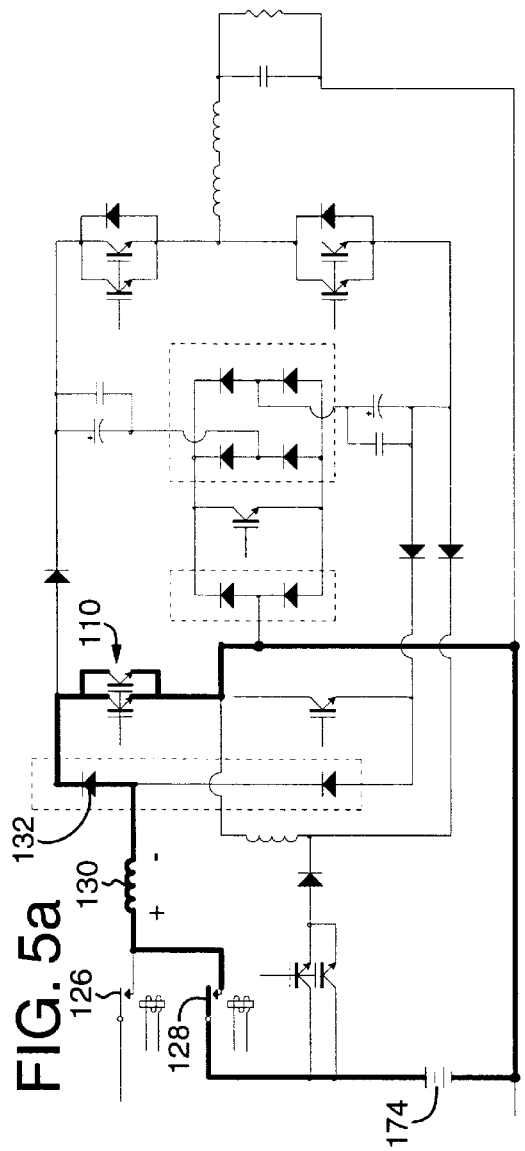
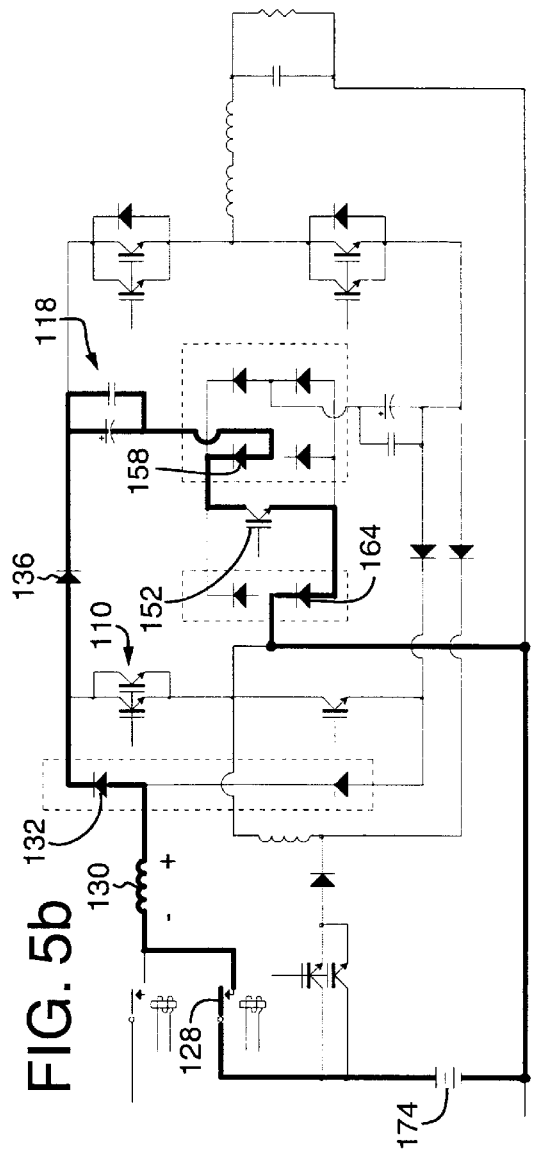

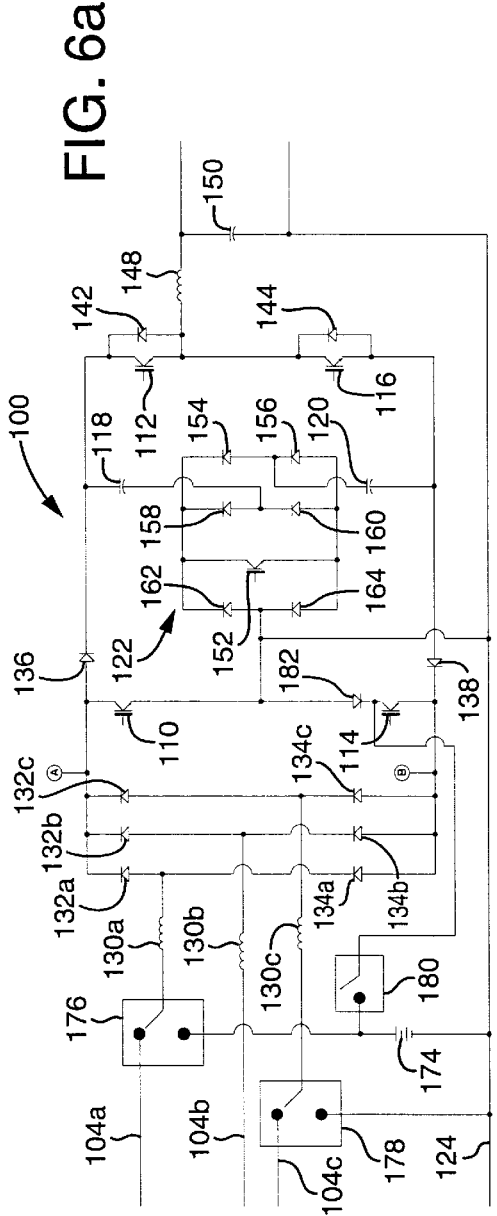
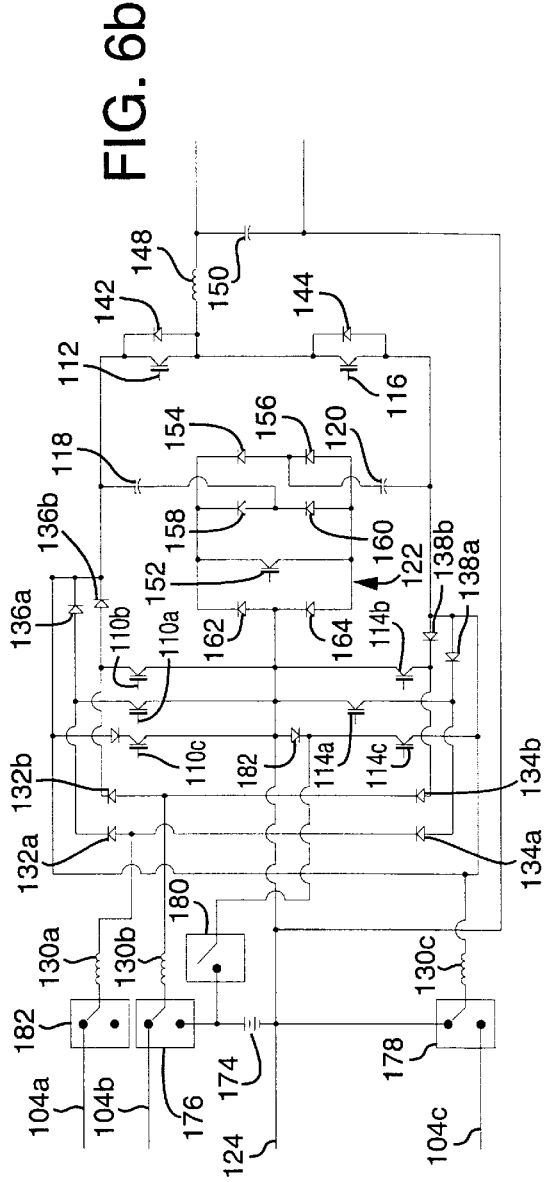

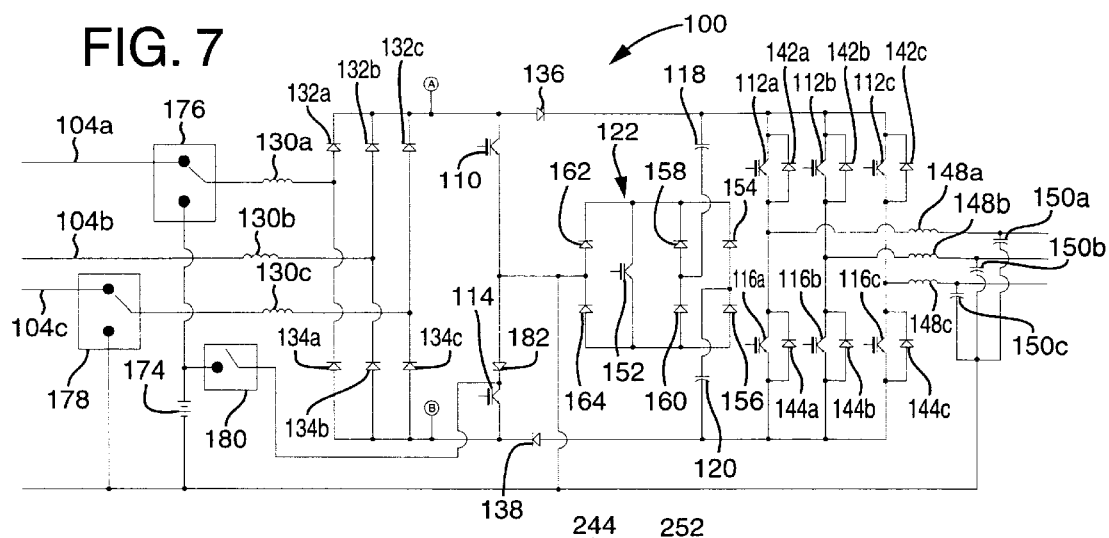

INVERTER HAVING CENTER SWITCH AND UNINTERRUPTIBLE POWER SUPPLY IMPLEMENTING SAME

This application claims benefit of the application No. 60/152,472 filed on Sep. 3, 1999.

FIELD OF THE INVENTION

This invention relates generally to power conversion systems that contain energy storage devices, and more particularly to uninterruptible power supply systems capable of supplying power from an AC line voltage with or without compensation, and from a battery storage element with or without boost-conversion.

BACKGROUND OF THE INVENTION

As more and more segments of the business environment enter the information age, more and more computers and increased computing power are required. As businesses move from the old to the new economy, their reliance on the processing, transference, and storage of digital information is becoming a more critical aspect of their overall business strategy. While in the past computer crashes were seen a mere nuisance, the loss of computing power and business data may well devastate a businesses' ability to survive in today's new economy. As such, the need for reliable, uninterruptible electric power to maintain the operational status of the computing equipment and the integrity of the digital data continues to rise.

To meet these requirements, uninterruptible power supplies (UPS) have been developed. These UPS's utilize a bank of electric storage batteries and solid state conversion equipment in association with the utility line voltage to provide continuous electric power to a businesses computer system in the event of a loss or deviation of power quality from the utility. The number of batteries contained within a UPS is dependent upon the business' length of time that it needs to operate in the event of a utility power system failure. Likewise, the number of power modules included in a modular UPS, or the power rating of a power conversion module in a fixed-size UPS, is dependent on the overall total system load required to be supplied thereby. As the electrical utilization requirements of a business' computing system grow, additional power modules or additional UPS's may be purchased and integrated into an overall uninterruptible power system for the business enterprise.

While a UPS is required to supply the entire electrical requirements of a system to which it is applied during loss of utility power, and while a business may choose to operate its UPS to condition the utility line power to provide high power quality to their computing equipment, during periods of normal utility line availability operation of the UPS may provide more inefficiencies than advantages. However, since the loss or corruption of utility line voltage often may not be predicted, disconnection of the UPS may result in momentary loss of utility power to the computing equipment and corresponding, loss of computing power and electronic data.

To overcome this problem and to increase the efficiency of the UPS during periods of normal utility line voltage operation, typical UPS's include some form of bypass circuitry to route the utility line voltage directly to the UPS output to which the computing equipment is coupled. Such a configuration of a typical UPS is illustrated in FIG. 26. As may be seen from this simplified single-line schematic, the AC line voltage input 101 is routed through a bypass circuit 103 to the UPS output 105 coupled to the load 107. By utilizing this bypass circuit 103 losses resulting from rectification of the AC line input voltage as well as losses resulting from the generation of an AC output voltage waveform through switches 111, 113, 115, and 117 may be avoided. Typically this bypass circuitry 103 comprises a back-to-back silicon controlled rectifier (SCR) circuit, although other bypass circuitry configurations are also applicable. Unfortunately, the addition of the bypass circuitry 103 adds substantial cost, thermal management problems, and volume to the UPS itself. Such disadvantages have long been accepted as a necessary evil to allow high efficiency operation during periods of normal utility line voltage operation.

Transition from this high efficiency bypass mode of operation to inverter operation requires that the inverter's bus capacitors 119, 121 be charged. Some prior UPS systems utilize soft charging circuitry comprising additional power semiconductor devices per capacitor or per bus (not shown) to control the charge rate. Alternatively, the front end devices 111, 113 could be modulated to bring the capacitors up to the proper voltage to allow proper output waveform generation. Unfortunately, these prior UPS systems were unable to supply power during this soft charging period. As a result, a momentary loss of the output voltage waveform could be experienced until the capacitors 119, 121 reach their proper charge. Additionally, the required additional power devices and requisite circuitry adds costs and thermal management problems as well as volume to the UPS system, which disadvantages have heretofore merely been accepted.

To allow scalability of the power provided by a UPS, each UPS power module must be able to generate an output voltage waveform in coordination with the other UPS power modules to supply the entire connected load. In addition to providing scalability, this configuration provides redundant operation to maximize the fault tolerance of the UPS and ensure continued electrical supply to the computing equipment. To ensure that a failure within any one of the power modules of the UPS does not result in the entire UPS being taken off-line thereby resulting in a loss of electrical supply to the computer equipment, each individual power module of a typical UPS system includes in-line fault isolation circuitry 123 that operates to isolate a failed power module from the output 105. Typically this fault isolation circuitry takes the form of in-line power semiconductors, back-to-back SCR's, electromechanical relays, etc. Unfortunately, this fault isolation circuitry 123 adds costs, thermal management problems, and volume to the UPS system.

SUMMARY OF THE INVENTION

The system and method of the present invention presents a new and improved double-conversion uninterruptible power supply utilizing a center switch circuit to disassociate the bus capacitors from the neutral connection. By coordinating operation of this center switch circuit, higher overall efficiencies are provided with a reduced part count, cost, and volume over prior UPS systems.

The double-conversion, center switch topology of the present invention overcomes the above-described and other problems existing in the art while providing three modes of operation. A first mode of operation is an economy mode, where some line conditioning is accomplished but the efficiency is maintained at a very high level. A second mode provides full double-conversion operation of the inverter, where the AC input utility power is converted to a bus DC and back again to an output AC voltage waveform. A third mode of operation is battery conversion, where the battery is utilized by the inverter topology to generate the output AC waveform to supply power to the connected loads during loss of utility line input voltage. In a preferred embodiment, the inverter does not utilize the battery as the DC bus, but instead steps up the battery voltage to a higher bus voltage to allow a simplified conversion to the output AC waveform. In one embodiment of the invention, the user may select the operating mode of the UPS system, while in an alternate embodiment the UPS can operate in a fully automatic intelligent mode, wherein the UPS determines whether to operate in the high efficiency bypass mode or as a conventional double-conversion inverter relying on either the utility line voltage or the battery.

Operation of the system of the present invention in the high efficiency mode is accomplished by opening the center switch circuit to disassociate the bus capacitors from the neutral connection and, in one embodiment, operating the inverter output switches at a rate equal to the AC line input to voltage waveform. In this way, minimal losses are incurred since the inverter is not performing any appreciable correction of the AC line power, neither regulation nor power factor correction, and the switching devices are switching at a low rate. This rate is typically 60 Hz in the United States and 50 Hz in Europe. In alternate embodiments, the output switches are merely left on to further increase the operating efficiency of the UPS.

The center switch circuit of the present invention provides the soft charging of the bus capacitors in a simplified manner as compared to the prior systems discussed above. In one embodiment of the present invention, the center switch circuit utilizes a single active switching device, and a passive diode ring (bridge). Alternate embodiments of the invention utilize different center switching configurations including both semiconductor and electromechanical switching devices alone and in combination with passive devices. Advantageously, these various embodiments of the center switching circuit provide the fault isolation required to maintain redundancy in the event of failure of any particular power module without the necessity of additional in-line power semiconductor circuitry as discussed above.

Other advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 5a–5d are single-line schematic diagrams of the embodiment of FIG. 2 illustrating power flow during operation in a DC boost-converter mode of operation;

FIGS. 6a–6b are single-line schematic diagrams illustrating an alternate embodiment of the present invention having a three-phase input and a single phase output with, and without boost conversion for the DC bus;

FIG. 7 is a single-line schematic diagram illustrating a further embodiment of the present invention having a three-phase input and a three-phase output with boost conversion of the DC bus;

FIG. 8 is a single-line schematic diagram of a further alternate embodiment of the present invention providing dual input and output couplings;

FIG. 9 is a single-line schematic diagram of the embodiment of FIG. 8 illustrating power flow in a high efficiency mode of operation;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
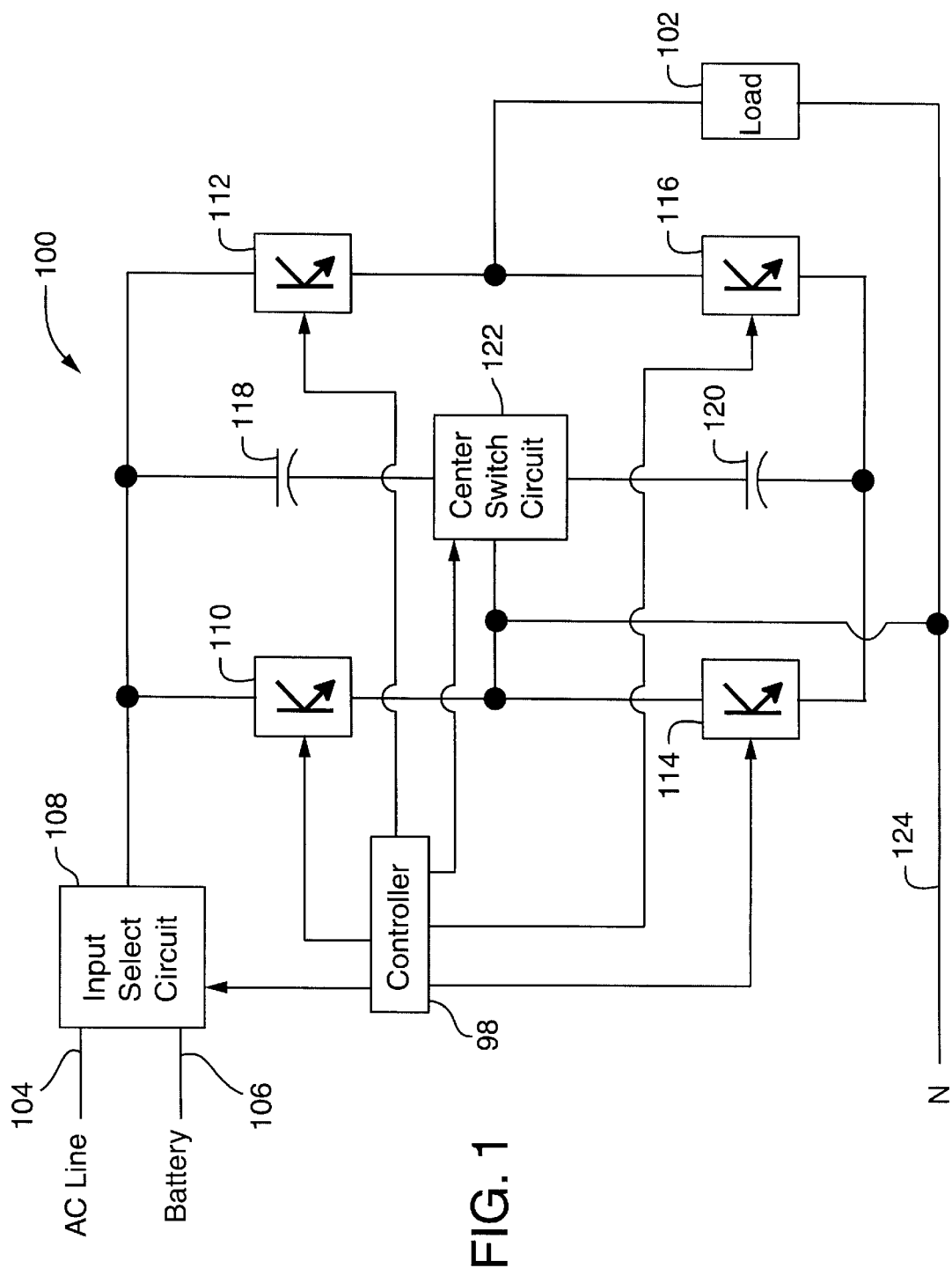
FIG. 1 is a simplified block-diagrammatic, single-line schematic of an uninterruptible power supply constructed in accordance with the teachings of the present invention.

The uninterruptible power supply (UPS) of the present invention is illustrated in simplified single-line schematic form in FIG. 1. It will be recognized by those skilled in the art that, while FIG. 1 illustrates one double-conversion inverter 100 coupled to a single load 102, embodiments of the UPS system of the present invention may utilize multiple power modules having similar internal topology as that illustrated in FIG. 1 coupled in parallel to supply the connected load 102. However, for the sake of simplicity and to aid in the understanding of the present invention, the following will provide a description of only a single double-conversion inverter 100. However, it should be understood that such description is made by way of illustration not by way of limitation. Further, aspects of the present invention are applicable to other inverter designs as will become apparent from the following description.

With specific reference now to FIG. 1, a UPS constructed in accordance with the teachings of the present invention includes an input for the AC utility line voltage 104 and an input for the electric power storage batteries 106. Depending on the operating mode of the UPS system determined by controller 98, an input select circuit 108 may be utilized to supply the appropriate power input 104, 106 to the inverter circuitry. This inverter circuitry includes multiple electronic switching elements 110, 112, 114, and 116. The inverter circuitry also includes DC bus capacitors 118, 120 that are coupled through a center switch circuit 122 to the neutral or return line 124. This center switch circuit 122 controllably associates and disassociates the DC bus capacitors 118, 120 from the neutral connection 124.

Figure 26:
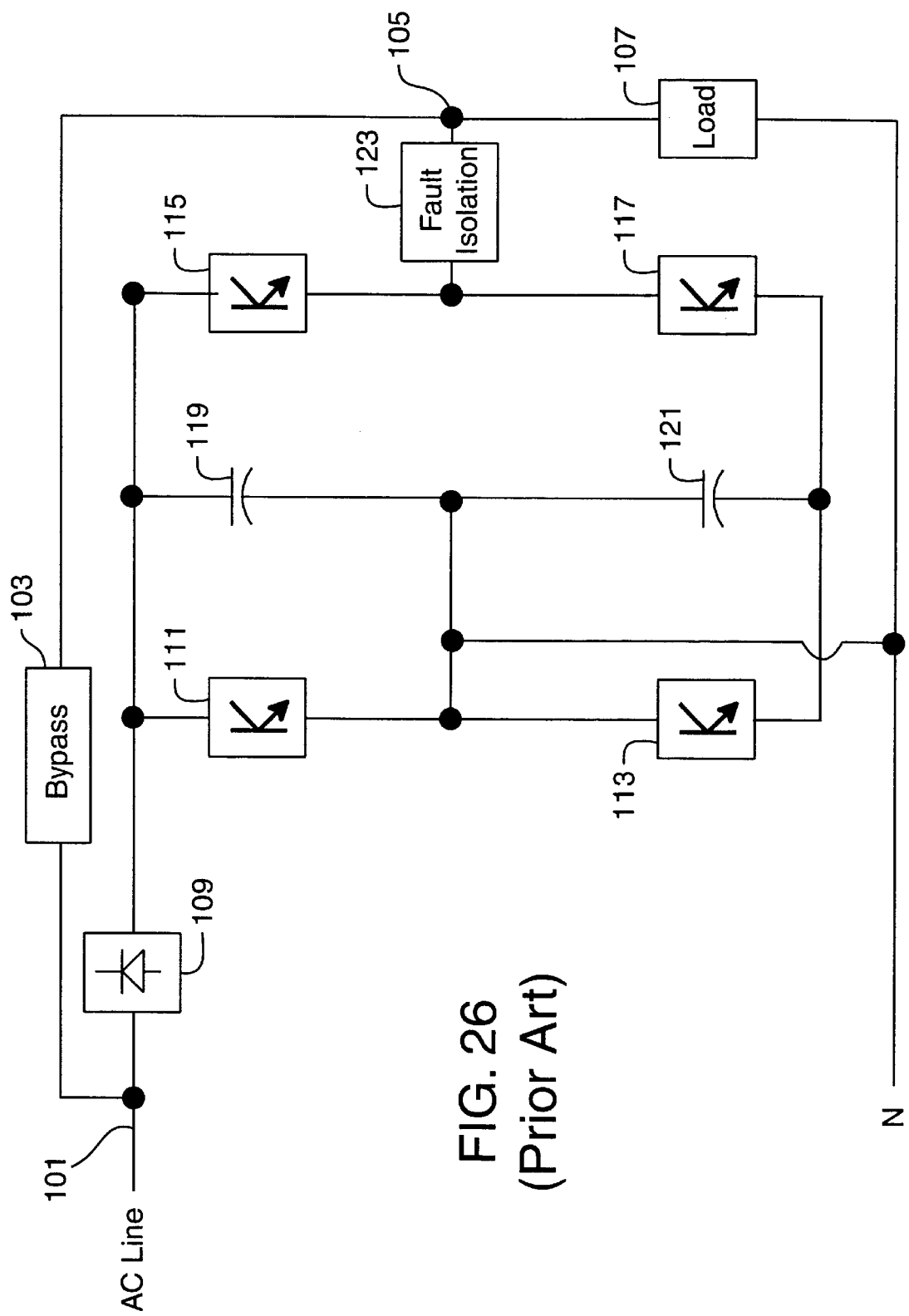
FIG. 26 is a block diagrammatic, single-line schematic illustration of a typical uninterruptible power supply.

The inclusion of this circuitry 122 provides significant advantages over prior design that utilize a permanent connection from the bus capacitors 118, 120 to the neutral connection 124, such as that illustrated in FIG. 26. While separate bypass and fault isolation circuitry may be included in the UPS of the present invention, operation of the center switch circuit 122 renders such circuitry superfluous. As a result, the UPS design of the present invention may operate in a high efficiency mode, may soft-charge the bus capacitors 118, 120, and may properly isolate a failed UPS module in a multiple UPS or modular UPS system without the need for the additional circuitry required by the prior designs.

Figure 2:
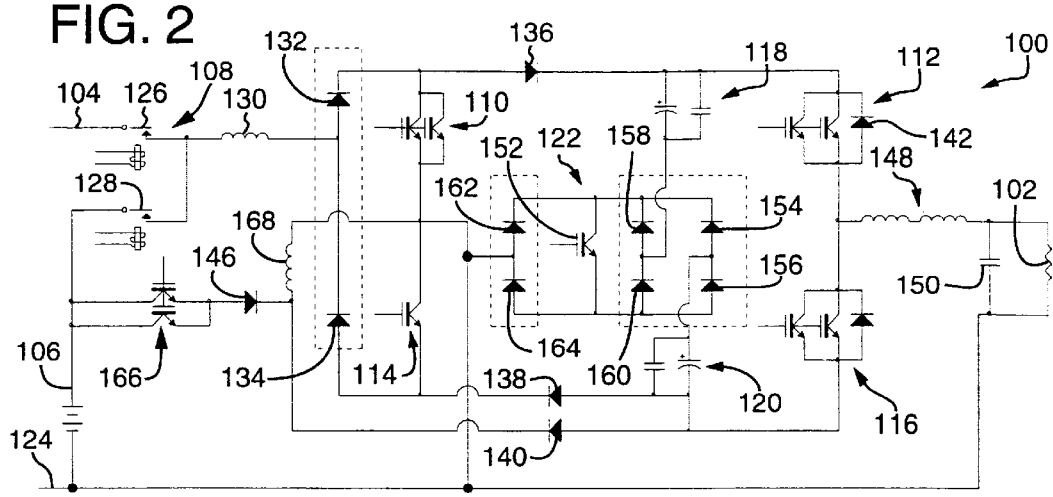
FIG. 2 is a single-line schematic diagram of an embodiment of the present invention.

To gain a better understanding of the features and advantages provided by the present invention, direction is now turned to FIG. 2, which illustrates a single-line schematic diagram of an embodiment of a UPS (or a single UPS power module for use in a modular UPS system). As will be recognized, like reference numerals have been used to generally indicate like elements from the simplified single-line schematic diagram of FIG. 1. In this embodiment of the invention, the input selected circuit 108 comprises two relays 126, 128 through an in-line inductor 130, the function of which will be described in detail below. Steering diodes 132, 134 ensure proper power flow through the inverter circuitry 100 in association with diodes 136, 138, 140, 142, 144, and 146.

Depending on the power requirements of the inverter circuitry 100, the switching elements 110, 112, 114 and 116 may utilize single or multiple-paralleled semiconductor switches as shown in this detailed single-line schematic. Likewise, the DC bus capacitors 118, 120 may utilize single or multiple-paralleled capacitors as appropriate to provide the required energy storage for the operating characteristics of the UPS. Output waveform conditioning is provided by an output inductor 148 and filter capacitor 150.

In this embodiment of the present invention, the center switch circuit 122 comprises a single active semiconductor switch 152 and a plurality of passive devices, such as diodes 154, 156, 158, 160, 162, and 164. The coupling to the individual DC bus capacitors 118, 120 are provided by the diode pairs 158/160 and 154/156, respectively. In like manner, the coupling to the neutral 124 is provided by the diode pair 1621164. While not specifically shown in the simplified illustration of FIG. 1, the embodiment of FIG. 2 also includes switching element 166 that is used in conjunction with diode 146 and inductor 168 to provide negative bus charging of capacitors 120 from the battery input 106 as will be discussed more fully below.

Figure 3A:
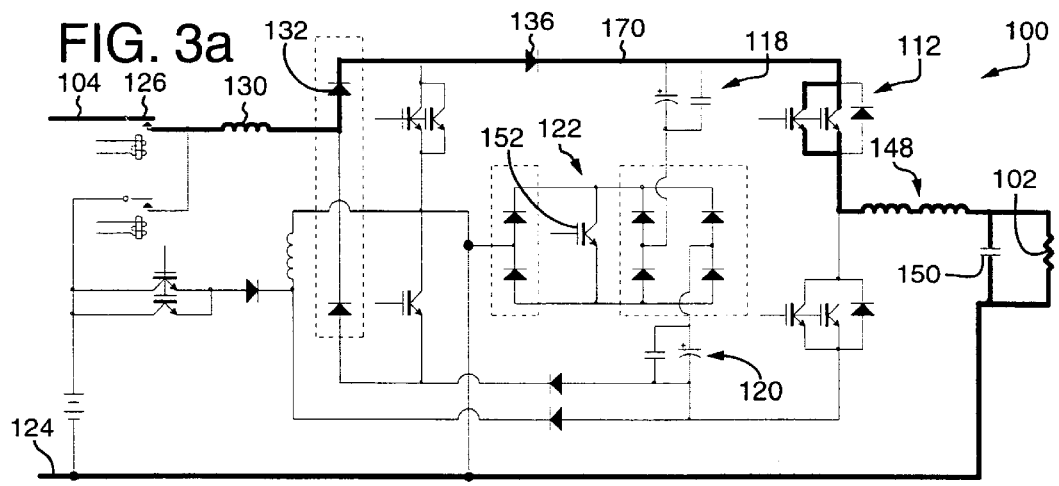
FIGS. 3a–3b are single-line schematic diagrams of the embodiment shown in FIG. 2 illustrating power flow in a high efficiency mode of operation.
Figure 3B:
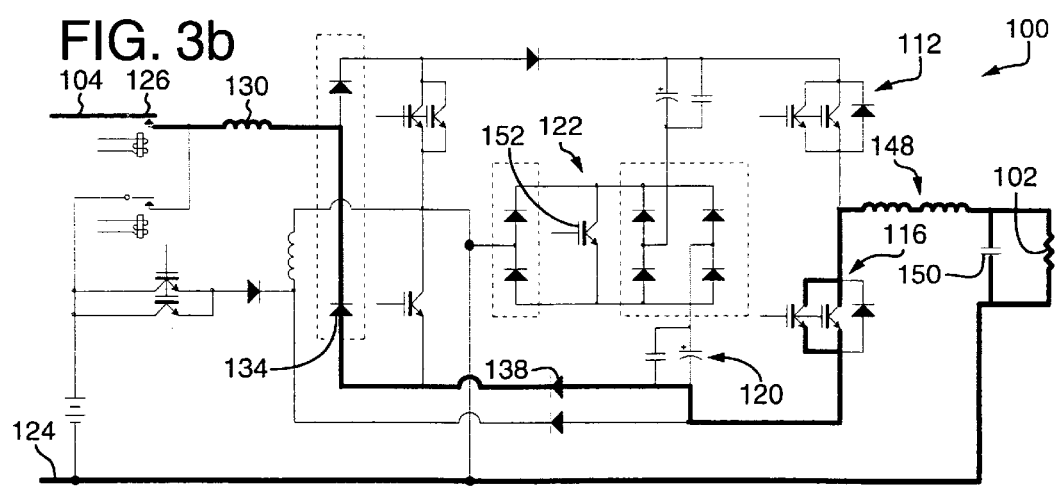

Operation of the embodiment illustrated in FIG. 2 will now be discussed with reference to FIGS. 3–5 for each of the operating modes enabled by the inclusion of the center switch circuit 122 of the present invention. The first mode of operation, the power flow of which is illustrated in FIGS. 3a and 3b, is the high efficiency mode of operation of the UPS circuit 100. The convention utilized to illustrate power flow in these figures is a darkened line through the appropriate elements of the circuitry through which power is flowing.

With reference first to FIG. 3a, the high efficiency mode of operation, which is appropriate during periods of normal utility line availability, provides very high efficiency operation in the range of 95% efficient without the use of external bypass circuitry. Specifically, the power flow during the positive half-cycle of the input AC line voltage flows through relay 126, inductor 130, diode 132, diode 136, switching element 112, output inductors 148 and capacitor 150, through the connected load 102, to the return 124. This power flow is enabled without the use of an external bypass circuitry by turning off the semiconductor switch 152 of the center switch circuit 122 to disassociate the neutral connection from the DC bus capacitors 118, 120. With this switching element 152 turned off, the DC bus capacitors 118, 120 are effectively removed from the circuit allowing the positive DC bus 170 to carry the positive half-cycle of an AC voltage waveform.

As the positive half-cycle of the AC voltage waveform approaches the zero cross and transitions to the negative half-cycle, switch 112 is turned off and switch 116 is turned on. This results in the power flow of the negative half-cycle of the AC line voltage as illustrated in FIG. 3b. During this negative half-cycle the power flow is from the neutral 124, through the load 102, the output capacitor 150, and inductors 148, down through switching element 116, through steering diodes 138 and 134, back through inductor 130 and relay 126 to line 104. As with the power flow during the positive half-cycle, very little losses are realized, on the order of the losses associated with the external bypass circuitry of typical inverter designs, without the resultant cost, thermal management, size, and reliability issues existing with such an external bypass circuit.

As will be recognized, such negative half-cycle power flow is made possible without an external bypass circuit by turning off the switching element 152 of the center switch circuit 122 to disassociate the negative DC bus capacitors 120 from the circuit. The power flow illustrated in FIGS. 3a and 3b continue to alternate during each respective half-cycle of the AC line voltage waveform with the associated turning on and off of switching elements 112 and 116 at a frequency equal to the AC line voltage input frequency. This switching rate is typically 60 Hz in the United States and 50 Hz in Europe. Such low switching rates provide very low switching losses, further enhancing the high efficiency operation of this circuit.

While not specifically illustrated in either of FIGS. 3a or 3b, during each of the respective half-cycles of the input AC waveform, the switching device 152 of the center switch circuit 122 may be pulse width modulated to establish a charge on the capacitors 118, 120. This provides soft charging of these bus capacitors 118, 120 during normal AC line voltage operation so that the UPS may immediately switch from the high efficiency mode to the double-conversion mode of operation or to the battery mode of operation upon degradation or loss of the AC line input from the utility. Such transition occurs without any interruption or loss of power to the connected loads 102 with the present invention. The pulse width modulation of the switching element 152 also ensures that the AC waveform is not disrupted in any appreciable fashion during this charging operation.

Figure 4A:
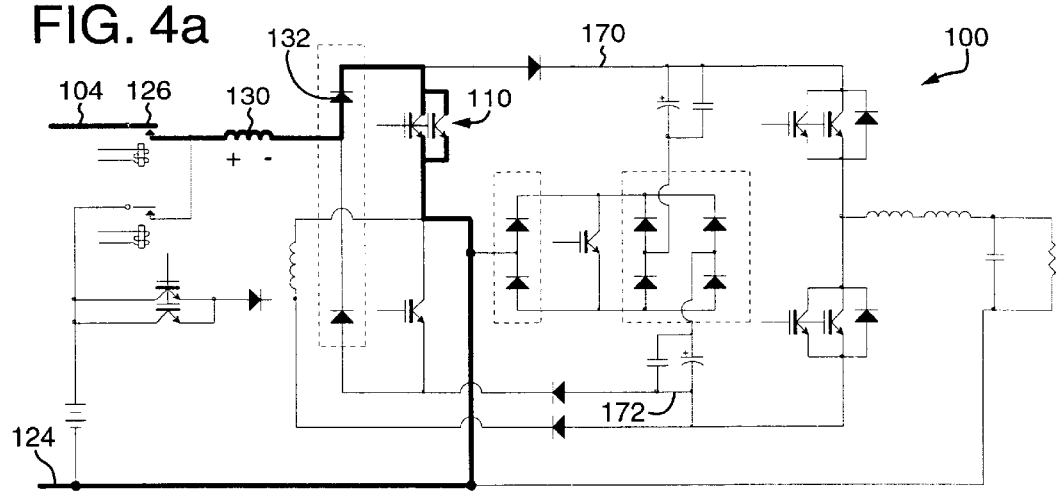
FIGS. 4a–4c are single-line schematic diagrams of the embodiment shown in FIG. 2 illustrating power flow in a double-conversion line mode of operation.
Figure 4B:
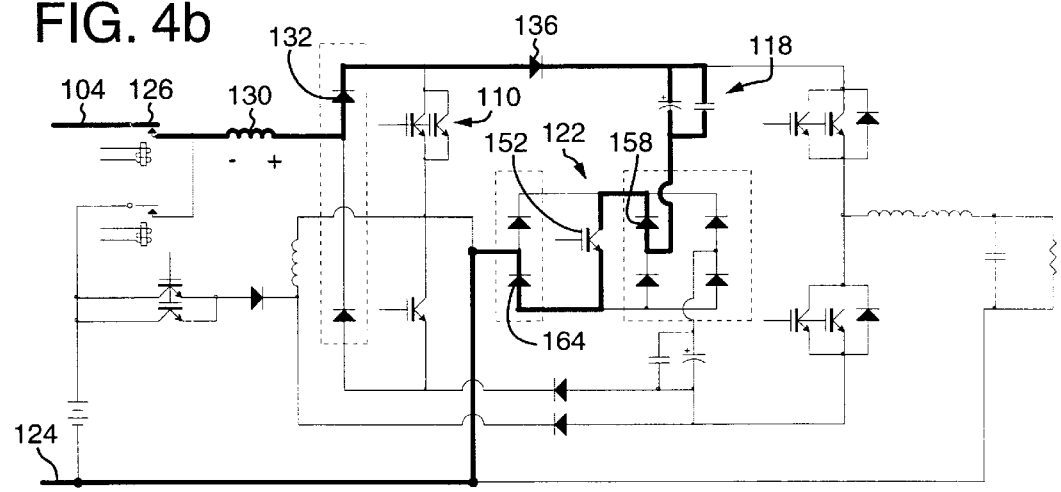
Figure 4C:
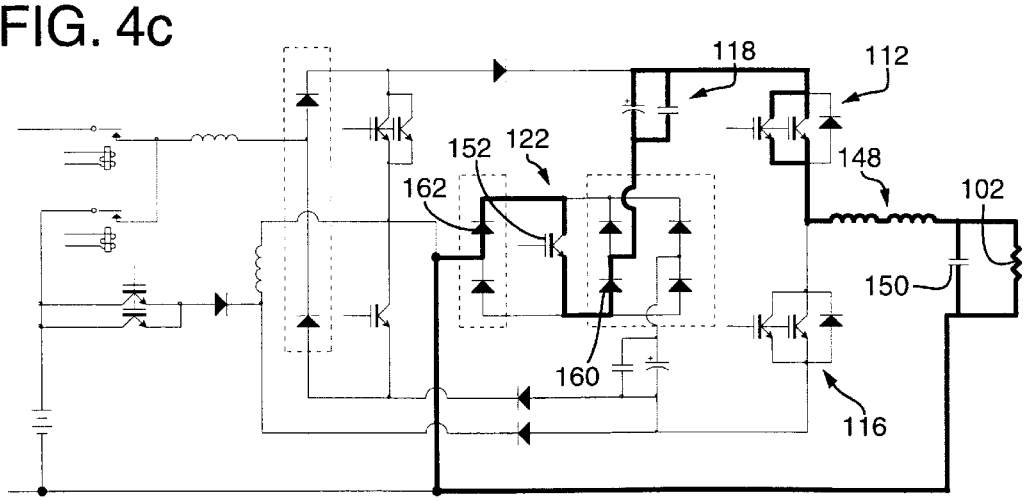

Turning now to FIGS. 4a–4c, the power flow during the double-conversion mode of operation of the UPS 100 will now be discussed. During this double-conversion mode of operation, the input voltage is conditioned from the utility AC line input 104, and the output power supplied to the connected loads 102 is regenerated from the dual DC bus 170, 172. Turning first to FIG. 4a, the power flow for charging the input inductor 130 during this double-conversion mode is illustrated. The control for this input (boost) converter is such that the switching devices are pulse width modulated in a manner such that the UPS 100 draws a current in the same wave shape as the voltage waveform. If, for example, the voltage waveform is a normal sinusoid, the current (once filtered) is drawn sinusoidally as well. In this way, the details of which will be described more fully below, this circuitry presents a unity power factor to the utility line 104.

As may be seen in FIG. 4a during the positive half-cycle of the AC line voltage input 104, power flows through the relay 126, input inductor 130, steering diode 132, through closed switches 110, and back to neutral 124. The semiconductor switches 110 need only be closed for a few microseconds to allow the current to build up in the inductor 130. The charging of the inductor 130 is necessary to provide boost conversion of the utility line input voltage 104 to the DC bus. In this way, the inverter may construct an output AC waveform of proper amplitude for use by the load 102.

Once the inductor 130 has been charged, its energy is then transferred to the DC bus capacitors 118 as is illustrated in FIG. 4b. This energy discharge from the input inductor 130 into the capacitor bank 118 is accomplished by turning off switches 110 and turning on switch 152 of the center switch circuit 122. Since the current through the inductor cannot change instantaneously, current continues to flow through this inductor 130 once the switches 110 have been opened.

To aid in the understanding of the operation of FIG. 4b it is helpful to consider inductor 130 as a current source. That is, while initially in FIG. 4a the polarity across the inductor 130 represented a voltage drop, once the switches 110 have been turned off the polarity of the input inductor 130 changes to that illustrated in FIG. 4b. As such, the voltage potential on inductor 130 adds to the line voltage from the utility line input 104. This higher potential overcomes the blocking provided by diode 136, causing power to flow in the path from the input 104 through relay 126 and from inductor 130, through diodes 132 and 136, into capacitors 118, through diode 158, through switching element 152, and through diode 164 to neutral. During this mode of operation, the switching device 152 of the center switch circuit 122 remains on continuously.

FIG. 4c illustrates the typical power flow of the output stage during this double-conversion mode of operation. For this output stage, the switching element 112 is modulated such that it provides a pulse train of varying duty cycle to generate the positive half-cycle of the output voltage waveform. This pulse train is then filtered by the output inductors 148 and capacitor 150 to present a sine wave to the load 102. The power flow for this positive half-cycle flows from the DC bus capacitors 118, through the pulse width modulated switching element 112, filtered by inductors 148 and capacitor 150, through load 102, and back to the bus capacitors 118 through the center switching circuit 122. Specifically, the power flow through the center switching circuit 122 takes place through diode 162, through switching element 152 (which remains in the on state), and through diode 160. The negative half of the sine wave output is generated in like manner utilizing pulse width modulation of switching element 116. As with the positive half-cycle generation, the switching element 152 of the center switch circuitry 122 remains in the on state.

Operation of the UPS circuitry 100 of the present invention in a DC (boost) converter mode will now be illustrated with reference to FIGS. 5a–5d. While one skilled in the art will recognize that a boost mode of operation is not required if an appropriate battery voltage is established by the battery 174, requiring such a high battery voltage is often not practical in commercial applications. Therefore, the boost DC conversion mode allows the use of a much smaller battery pack having an output voltage of, for example, 120 volts DC. The operation of the UPS circuitry 100 of the present invention is capable of boosting the battery voltage to a preferred +/−400 volts DC required by the output stage to generate a typical output voltage waveform for the connected loads 102.

The power flow for this DC boost-converter mode of operation, as illustrated in FIG. 5a, begins by opening relay 126 and closing relay 128. Additionally, switching element 110 is turned on, which allows current to build through the input inductor 130 through diode 132. As is illustrated by the polarity markings on the inductor 130 in this initial phase of this operation, the inductor appears as a voltage drop in the series circuit.

When the inductor is charged sufficiently or the current limit is reached, the switching element 110 is opened as illustrated in FIG. 5b. When this switching element 110 is opened the input inductor 130 becomes a current source (note polarity symbols) that adds to the battery potential. As the voltage rises, diodes 132 and 136 become forward biased and conduct power into the capacitor 118. To allow this power flow, the switching element 152 of the center switching circuit 122 is closed upon opening of the switching element 110. As a result, current flows from the battery 174 through relay 128, and from inductor 130 through diodes 132 and 136 to the DC bus capacitor 118. From the capacitor 118 the current flows through diode 158, through closed switching device 152, and through diode 164 back to neutral.

Figure 5C:
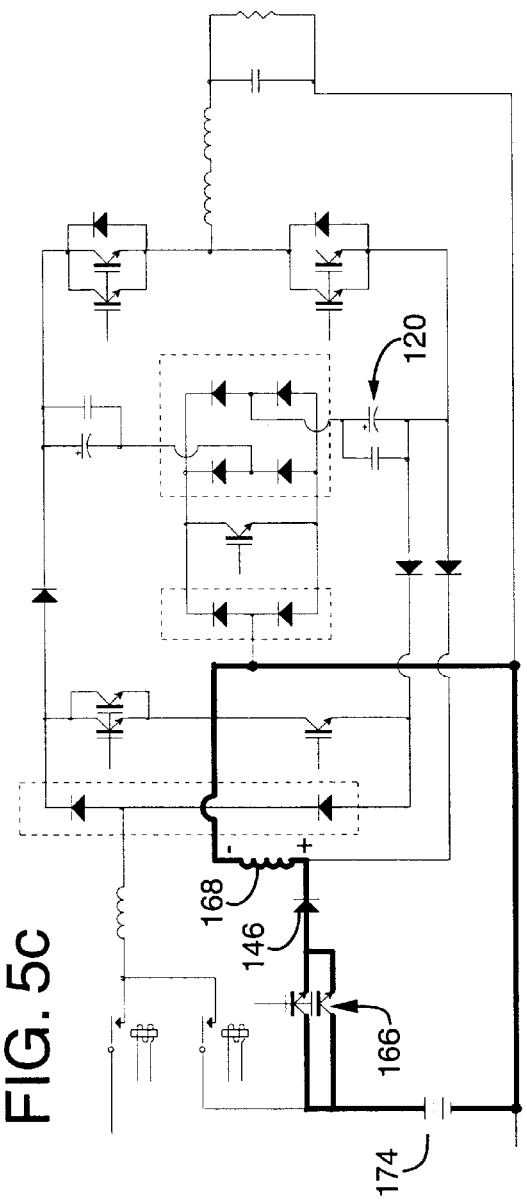
Figure 5D:
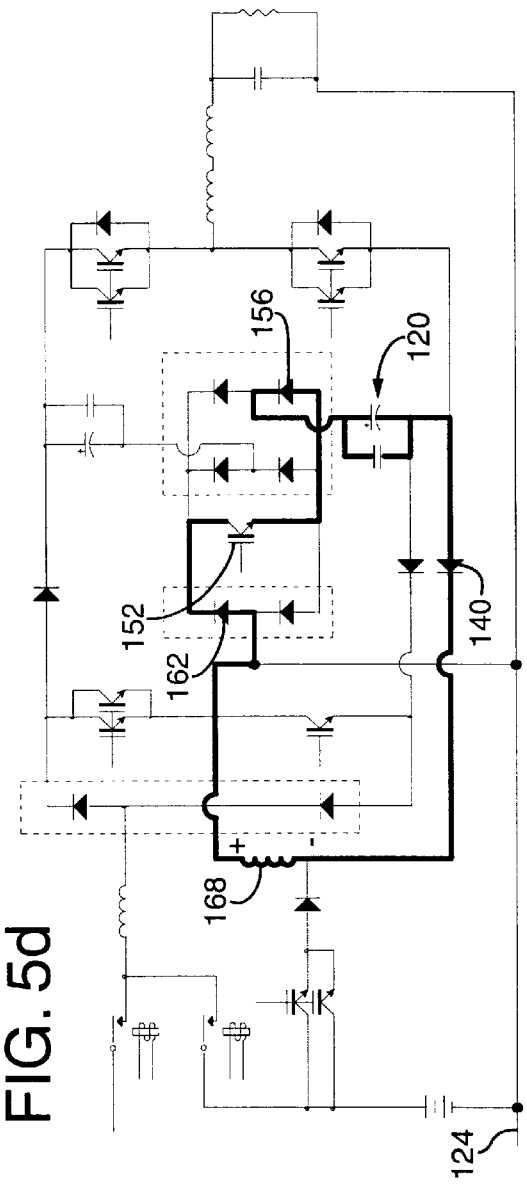

In order to charge the negative DC bus capacitors 120 from the battery 174, switching element 166 is turned on to allow current flow through diode 146 and inductor 168 as illustrated in FIG. 5c. Once the inductor 168 is sufficiently charged or current limit is reached, switching element 166 is opened and the inductor 168 becomes a source as illustrated in FIG. 5d. Since the positive side of inductor 168 is tied to neutral 124 the more negative end of inductor 168 goes negative from neutral. The power flow is then from inductor 168, through diode 162, through switching element 152, through diode 156, through negative bus capacitors 120, and through diode 140. Once the bus capacitors 118, 120 are charged, the output waveform generation proceeds as discussed above with reference to FIG. 4c.

Having now described the operation of a single phase input/single phase output embodiment of the invention, attention is now directed to FIG. 6a wherein is illustrated an alternate embodiment of the present invention. Specifically, FIG. 6a illustrates a single-line schematic diagram of a three-phase in/one-phase out embodiment of the UPS 100 of the present invention. As with the prior single-phase embodiment, a center switching circuit 122 is provided to controllably associate/disassociate the DC bus capacitors 118, 120 from the neutral 124 of the UPS 100. Operation of this three-phase in/one-phase out embodiment proceeds essentially as discussed above for the various modes of operation.

As will be apparent to those skilled in the art from the foregoing description, the input utility voltage on line $104_a$ flows through relay 176 and inductor $130_a$. During the positive half-cycle, this waveform is conducted through diode $132_a$, and through diode $134_a$ on the negative half-cycle. In like manner, the utility line voltage on line $104_b$ conducts through inductor $130_b$. During its positive half-cycle the waveform conducts through diode $132_b$, and through diode $134_b$ on its negative half-cycle. The utility line voltage on line $104_c$ will conduct through relay 178 and inductor $130_c$. On the waveform's positive half-cycle it will conduct through diode $132_c$, and through diode $134_c$ on its negative half-cycle. The rectified sum of the positive phases is seen at node a, and the rectified sum of the negative phases is seen at node b.

To charge the input inductors $130_a$–$130_c$ switching element 110 is turned on. Current from the individual AC input lines which are going positive at that particular time flow through their respective input inductors $130_a$–$130_c$, through their respective input diodes $132_a$–$132_c$, through switching element 110, to neutral 124. As described above, energy is stored in the input inductors $130_a$–$130_c$ during this operation. When switching element 110 opens, current continues to flow from the input line through the respective input inductors and diodes, through diode 136, and through DC bus capacitor 118 to deliver a charge thereto. The current continues to flow through diode 158, switching element 152, and diode 164 of the center switch circuit 122 to neutral 124.

To store energy in the input inductors $130_a$–$130_c$ during the negative half-cycle of each of the utility line input to voltages $104_a$–$104_c$, switching element 114 is closed. Current will then flow from the neutral 124 through diode 182 and switch element 114, through each of the respective diodes $134_a$–$134_c$ and the respective input inductors $130_a$–$130_c$, to each of the input utility lines $104_a$–$104_c$ as each becomes negative. When switch 114 opens, current continues to flow through the respective input inductors $130_a$–$130_c$ and diodes $134_a$–$134_c$. The current flow will proceed from the neutral 124, through diode 162 and closed switching element 152 of the center switch circuit 122. The current will continue through diode 156 and the negative DC bus capacitor 120, through diode 138 to the respective diodes $134_a$–$134_c$, and back to the respective input inductors $130_a$–$130_c$. In a preferred embodiment, switches 110 and 114 are switched at a frequency of approximately 10 kHz or higher. The switching of elements 110–114 can be controlled such that power factor correction of the current can be achieved on all three input phases.

Boost-converter operation when this embodiment is utilizing the battery 174 to power the output is achieved by switching input relays 176 and 180 from the line to the battery position. Relay 178 also switches to connect inductor $130_c$ to the neutral line 124. Further, relay 180 is switched to couple the positive terminal of the battery 174 to the collector of switch element 114. During the battery operation, a charge is maintained on DC bus capacitor 118 by controlling switching element 110, although charge maintained on the negative DC bus capacitor 120 is maintained by controlling switching element 114 in a manner similar to that described above. That is, as switching element 110 turns on current flows from the battery 174, through input inductor $130_a$ and diode $132_a$, through switching element 110, and back to the battery. As discussed above, energy is stored in the input inductor $130_a$ at this time. As switch 110 is turned off, current continues to flow from the battery 174, and the inductor $130_a$, through diode $132_a$ and diode 136, through the DC bus capacitor 118 and the center switch circuit 122 to neutral. Specifically, the current flows through diode 158, through the closed switching element 152, and through diode 164 to neutral.

To charge the negative DC bus capacitor 120, the switching element 114 is turned on. Current then flows from the battery 174 through relay 180, through switch 114, through diode $134_c$ and inductor $130_c$, through relay 178, and back to the battery. As may be appreciated, energy is stored in the inductor $130_c$ during this period. When switching element 114 is turned off, current continues to flow through inductor $130_c$, through relay 178, through diode 162 and closed switching element 152 of the center switching circuit 122. Current continues to flow through diode 156 and through capacitor 120, through diode 138 and diode $134_c$ back to the input inductor $130_c$. This power flow transfers energy to the negative DC bus capacitor 120 for subsequent utilization in the generation of the output to voltage waveform to supply the connected loads 102.

The energy stored in the DC bus capacitors 118, 120 is converted to a sine wave voltage output to the connected load 102 through output inductor 148 and capacitor 150. Switching elements 112 and 116 are pulse width modulated at frequencies of approximately 10 kHz or higher to construct such an output waveform. As discussed above, inductor 148 and capacitor 150 provide filtering of the PWM output signal to smooth the sine wave output voltage. When switching element 112 turns on, current flows from the DC bus capacitor 118 through this switching element 112, through inductor 148 and capacitor 150 and the parallel connected load 102, through diode 162 and closed switching element 152, and through diode 160 back to capacitor 118. When the output switch 112 turns off, current continues to flow through inductor 148, which causes diode 144 to conduct. Current now flows from capacitor 120, through diode 144, inductor 148, capacitor 150 and the parallel connected load, through diode 162 and closed switching element 152, continuing through diode 156 back to capacitor 120. Once switching element 112 is off, switching element 116 is turned on to provide a proper current path with reactive load. As will be understood, the modulation of switching element 112 creates the positive half-cycle of the output to voltage waveform.

To supply the negative half-cycle of the output voltage waveform, the switching element 116 is turned on so that current may flow from the DC bus capacitor 120, through diode 154, closed switching element 152, and diode 164, through capacitor 150 and the parallel coupled load 102, through inductor 148, through closed switching element 116, and back to capacitor 120. When switching element 116 turns off, current continues to flow through the inductor 148, which causes diode 142 to conduct. Current now flows from inductor 148, through diode 142, through capacitor 118, through diode 158 in closed switching element 152, through diode 164, and through capacitor 150 and the parallel coupled load 102. When switching element 112 is off, switching element 116 is turned on to provide a proper current path with reactive load. As is now apparent, the modulation of switching element 116 produces the negative half-cycle of the output AC voltage waveform.

An alternate embodiment of a three input phase/one output phase topology is illustrated in FIG. 6b. As is apparent from this single-line schematic diagram, the center switch topology is maintained to selectively associate/disassociate the DC bus capacitors 118, 120 from the neutral connection 124 as described above. The input stage of this embodiment differs somewhat from the embodiment illustrated in FIG. 6a in that switching pairs 110$_a$/114$_a$, 110$_b$/114$^b$, and 110$_c$/114$_c$ are included for each of the individual three phase inputs 104$_a$, 104$_b$, and 104$_c$, respectively. Additionally, the input phase-switching through relays 176, 178, 180, and 182 to control and isolate each of the various operating modes occurs in similar fashion to that described above.

FIG. 7 illustrates a further embodiment of the UPS of the present invention having three input phases and generating three output phases for three-phase connected loads. The input stage operation of this embodiment of the present invention is similar to that described for the embodiment illustrated in FIG. 6a also having three input phases. Likewise, the output voltage waveform generation for each of the output phases also utilizes a similar control strategy for its generation. Therefore, the various details of the operation of this circuit will not be described in the interests of brevity. Suffice it to say that the pulse width modulation of the output switch pairs for each output phase may be individually controlled to supply separate individual outputs, or may be coordinated to provide a three-phase output voltage waveform.

The UPS of the present invention has universal applicability to the various power distribution specifications used throughout the world. It can be used as a 120 volt system, a 120/240 split-phase system, or a 120/208 volt UPS. The UPS of the present invention also can be used in Japanese utility systems operating at 100/200 volts. To operate in the split-phase mode, the embodiment of the present invention illustrated in FIG. 8 is applicable. As with the previous embodiments of the UPS of the present invention, this embodiment also is capable of operating in various modes. In a high efficiency mode of operation, minimal losses are incurred as the UPS is not correcting power factor (neither regulation nor power factor correction) and the switching devices are not switching. In the true double-conversion mode of operation, the input voltage is conditioned and the output power is regulated from a dual DC bus as shown in FIG. 8. The boost conversion mode of operation when relying on the battery 174 is also available and will be discussed below.

One subset of the operating modes of this embodiment of the UPS of the present invention is the phase shifted input/output. In 120 volt use the two input line voltages 200, 202 as well as the two output voltages 204, 206 are operated in parallel. In the phase-shift mode they are effectively in series, and run either 120 degrees, 180 degrees, or 240 degrees out of phase with each other. Running either 120 degrees or 240 degrees apart gives the 120/208 or 127/220 voltages by vector addition. Operating 180 degrees out of phase gives the split-phase 120/240, 115/230, 110/220, or 100/200 volt outputs. Regardless of the mode of operation, note that the neutral 208 is carried through always.

As will be recognized by those skilled in the art from an analysis of FIG. 8, the first utility line input 200 is coupled through a relay 210 to inductors 212, 214. The other side of inductor 212 is coupled through diode 216 to switching device 218 and its anti-parallel diode 220. Switch 218 is coupled through output inductor 222 and filter capacitor 224 to its parallel coupled load 226. In like fashion, inductor 214 is coupled through diode 228 to switching device 230 and its anti-parallel diode 232. This switch 230 is also coupled through an output inductor 234 and an associated filter capacitor 236 to its parallel coupled load 238. A switching element 240 and its antiparallel connected diode 242 are coupled to the positive rail 244 of a first DC bus. DC bus capacitor 246 is also coupled to the positive rail 244, and to a center switch circuit 122 as described above. A second switching device 248 and its anti-parallel connected diode 250 are coupled to the positive rail 252 of the second DC bus. A second DC bus capacitor 254 is also coupled to the positive rail 252 of the second DC bus, and to the center switch circuit 122 as illustrated.

Switching device 256 and its anti-parallel diode 258 are coupled to the negative rail 260 of the first DC bus, as is DC bus capacitor 262. This DC bus capacitor 262 is also coupled to the center switch circuit 122 as illustrated. Switching device 264 and its anti-parallel connected diode 266 are coupled to the negative rail 268 of the second DC bus. DC bus capacitor 270 is also coupled between the negative rail 262 of the second DC bus and to the center switch circuit 122 as illustrated. The inductor 214 is coupled through switching element 272 and diode 274 to the node coupling switching devices 240 and 256. The second line voltage input 202 is coupled through relay 276 to inductor 278. Steering diode 280 couples the negative rail 268 of the second DC bus to inductor 278. Switching elements 282 and 286, in association with their anti-parallel connected diodes 284 and 288 are coupled to output inductors 234 and 222 and to their respective negative rail DC busses 260, 268.

In the high efficiency mode of operation, it does not matter how the inputs are phase connected. In this mode, switching elements 248, 230, 256, and 282 are always on, i.e., no switching of these devices is occurring. As input utility voltage on line 200 goes positive, the power flows through relay 210, inductor 212, diode 250, switching element 230, inductor 234 and capacitor 236, to the parallel connected load 238, and back to neutral 208. During the negative half-cycle of the utility voltage on line 200, power will flow from neutral 208, through the load 238 and its parallel coupled capacitor 236, through inductor 234, diode 232, switch 248, inductor 212, and relay 210, and back to the line 200.

In like fashion, the utility voltage on line 2 transfers power to its connected load through relay 276, inductor 278, switch 256, diode 284, inductor 222, and capacitor 224, to its parallel connected load 226, and back to neutral 208. As line 202 traverses its negative half-cycle, power flows from the neutral 208 through its connected load 226 in the parallel capacitor 224, through inductor 222, switching element 282, diode 258, inductor 278, relay 276, and back to the line 202.

Note that during the high efficiency power mode of operation, switching element 152 of center switch circuitry 122 is off to disconnect the DC bus capacitors 254, 246, 270, 262 from the power path. However, switching element 152 may be pulse width modulated during the high efficiency mode of operation to soft charge the DC bus capacitors 254, 246, 270, 262. This will assure that these capacitors are ready to source current for mode changing or line transfer if, and immediately when, required.

Also note that in this embodiment of the present invention, the inverter switches are not transitioned during the high efficiency mode of operation as they were in the embodiment illustrated in FIG. 2. In this embodiment power flow for both the positive and negative half-cycles are accomplished through the output switching element and its anti-parallel connected diode. This allows the same power path to be utilized for both the positive and negative half-cycle of the utility line voltage, further increasing the efficiency of operation in this mode.

In the double-conversion mode of operation, switching element 152 of the center switch circuitry 122 is turned on to afford the capacitors a discharge path to neutral. In practice, the actual voltage will be perhaps 2 volts off from neutral as there are voltage drops associated with the diodes and the switching element 152. Also in this double-conversion mode of operation the switching elements are pulse width modulated in a manner that the UPS draws a current in the same wave shape as the voltage. If, for example, the voltage wave shape is a normal sinusoid, the current (when filtered) is drawn sinusoidally as well. When the input is the battery, current is drawn DC. In this way, a unitary power factor is presented to the line, with minimal harmonic currents.

Figure 10A:
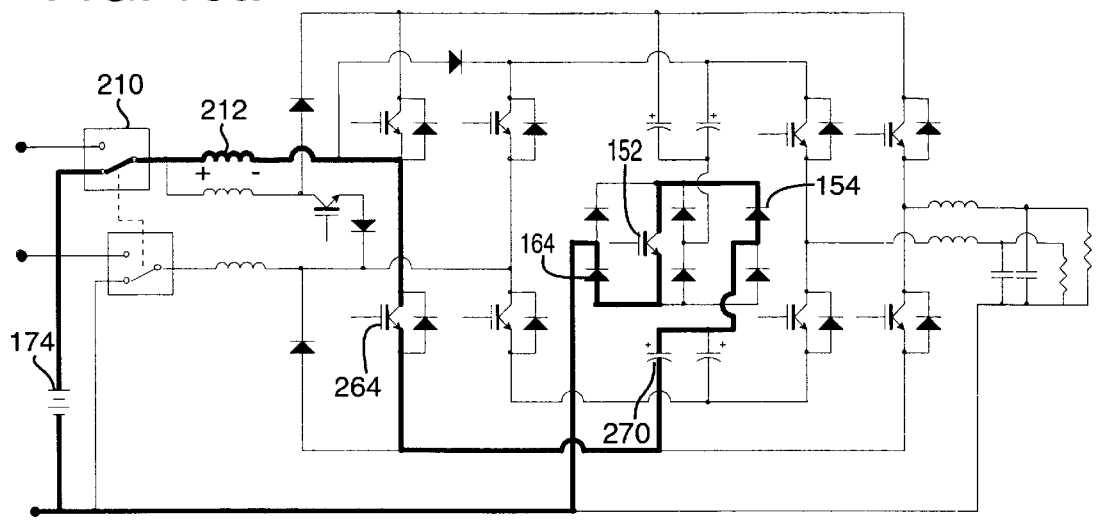
FIGS. 10a–10d are single-line schematic diagrams of the embodiment of FIG. 8 illustrating power flow in a battery boost DC mode of operation.
Figure 10B:
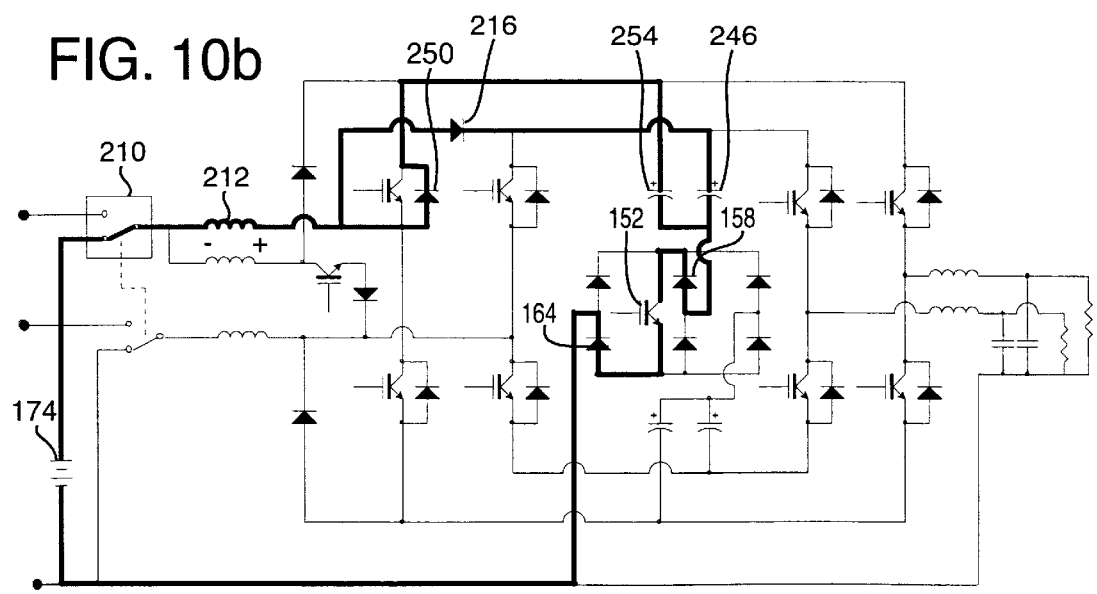

Turning to FIG. 10a, power flow is illustrated to charge inductor 212 to provide a battery boost for the positive bus. As shown, power from battery 174 is provided to inductor 212 and through relay 210, which is switched to make the coupling therebetween. The power continues to flow through switching element 264, through capacitor 270 (which discharges slightly in the process), through diode 154, through switching element 152 and diode 164, back to neutral. The switching element 264 need only be closed for a few microseconds at a time. When switching element 264 is opened, as illustrated in FIG. 10b inductor 212 becomes a current source. As the polarity of this inductor 212 reverses, the current flow path is through the inductor 212, through diodes 250 and 216, and into, respectively, bus capacitors 254 and 246. The current continues to flow through diode 158, switching element 152, diode 164, through battery 174 and back to inductor 212 through relay 210.

Figure 10C:
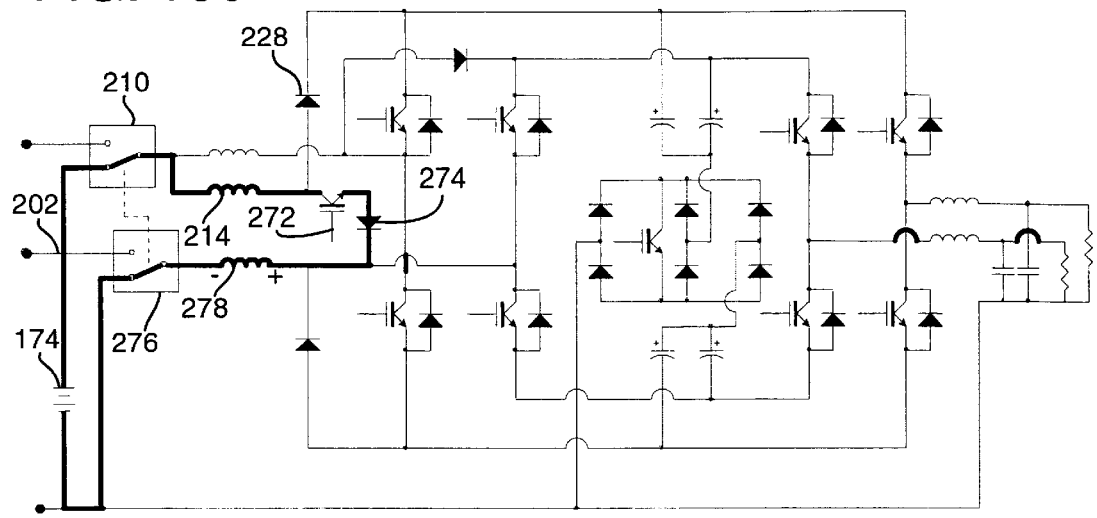

To provide a similar battery boost to charge the negative DC bus, FIG. 10c illustrates the charging of inductor 278. As illustrated in this FIG. 10c, current flow from battery 174 through relay 210 continues through inductor 214 via switching element 272, diode 274, inductor 278, and relay 276. During this operation inductor 214 presents only a negligible drop since it is a small inductor for noise filtration. However, diode 228 does clamp its energy upon turn-off of switching element 272.

Figure 10D:
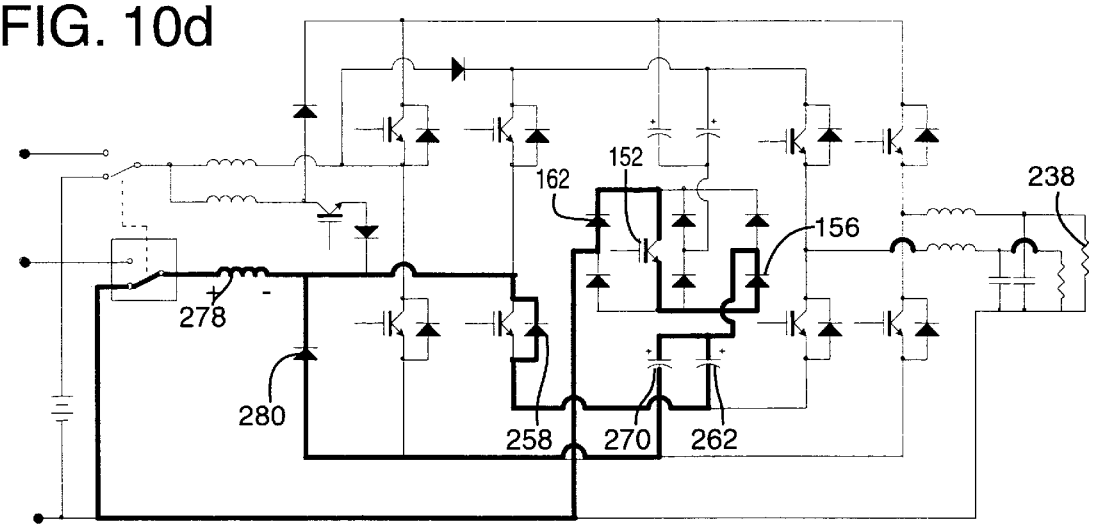

Once switching element 272 turns off, inductor 278 becomes a current source as illustrated in FIG. 10d. As may be seen from this FIG. 10d, the polarity of inductor 278 switches and provides power flow through diode 162, switching element 152, diode 156, and negative DC bus capacitors 270 and 262. Power flow continues through diodes 258 and 280 back to inductor 278. This results in the charging of the negative DC bus capacitors 270 and 262.

Figure 11A:
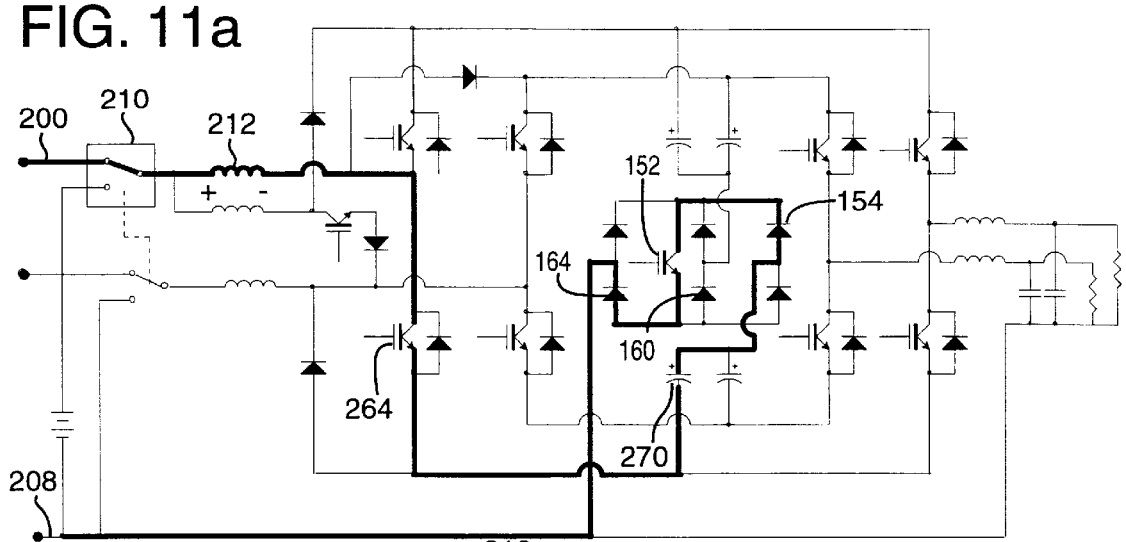
FIGS. 11a–11c are single-line schematic diagrams of the embodiment of FIG. 8 illustrating power flow in a double-conversion mode of operation.

Having now described the boost conversion of the battery power, attention is now directed to FIG. 11a which illustrates the power flow for the AC front end during line operation to charge inductor 212. Since operation of the UPS of the present invention under different line phases and polarities is similar, the following discussion will describe only the operation of the present invention on the positive half-cycle of the utility line voltage 200. Operation with other polarities and phases follow the same scheme with mirrored devices.

Figure 11B:
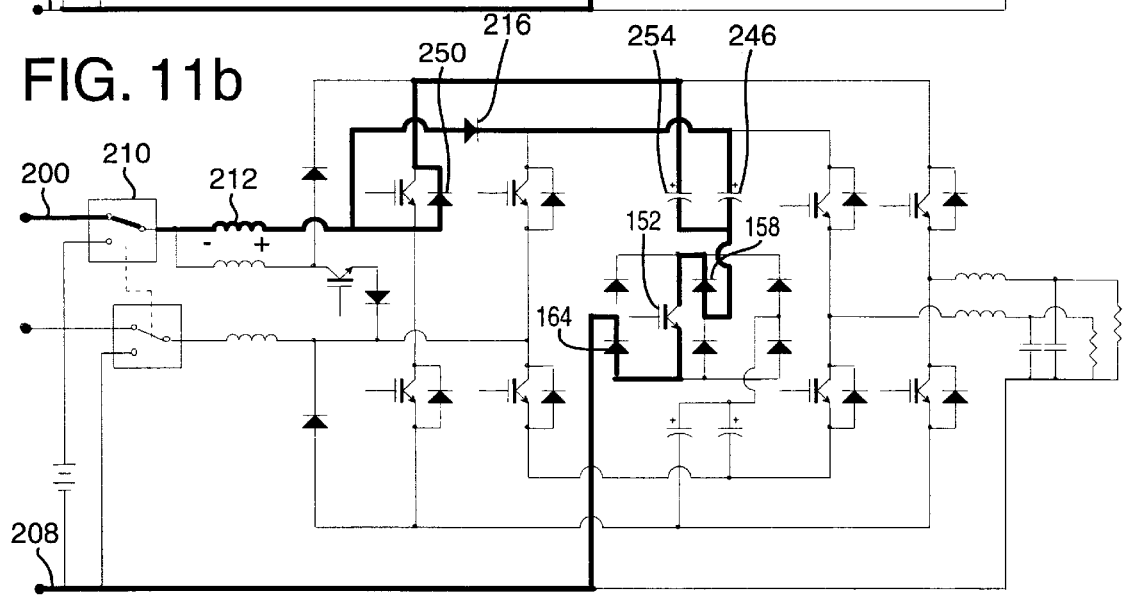

On the positive half-cycle of line voltage 200, power flows through relay 210 and through inductor 212. The current flow continues through switching device 264, DC bus capacitor 270 (which discharges slightly), and continues through diode 154, switching element 152, diode 164, and returns to neutral 208. When transistor 264 turns off, inductor 212 becomes a current source as is illustrated in FIG. 11b. As such, the current from inductor 212 supplements the line current. When the combined potential of the line 200 plus the inductor 212 exceeds that of the voltage on capacitors 254 and 246, current flows from inductor 212 through diode 250 and diode 216 into capacitors 254 and 246, respectively, through diode 158, switching element 152, diode 164, and back to neutral 208.

Figure 11C:
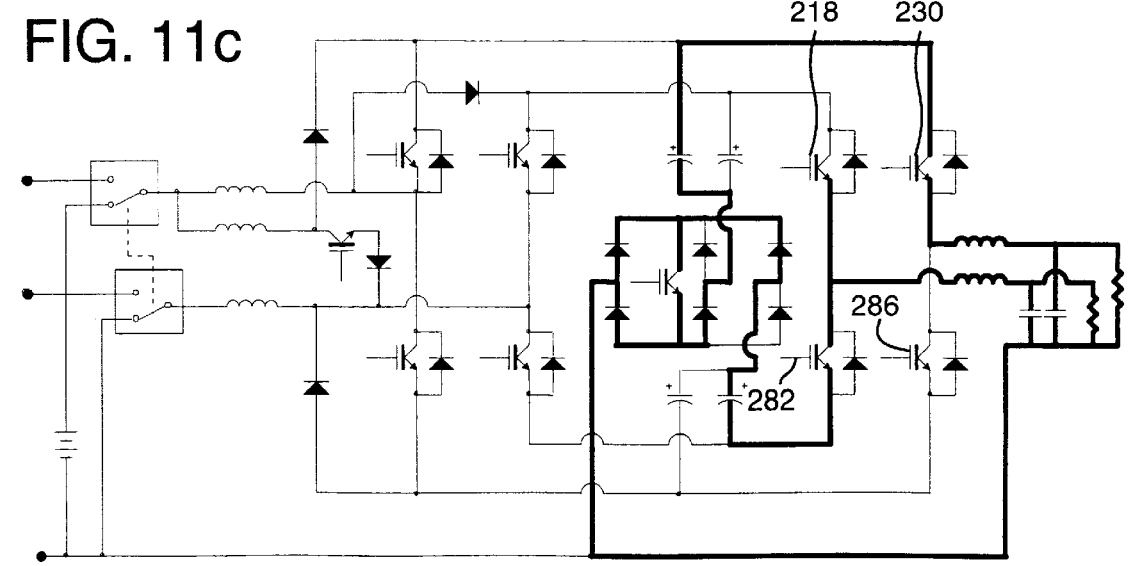

FIG. 11c illustrates the operation of the output switches once the DC bus capacitors have been charged as described above. Once again, since the operation of the UPS of the present invention under different output phases and polarities is the same, only one phase/polarity is discussed here, it being recognized that the operation of other polarity and phases follows utilizing the same scheme with mirrored devices. This embodiment of the UPS of the present invention utilizes a split bus approach whereby power is drawn only from one bus per half-cycle. As illustrated in FIG. 11c, switching devices 230 and 286 (as with switching devices 218 and 282) make up a half bridge circuit, which is pulse width modulated to achieve a sine wave output. With this operation, the UPS of the present invention achieves the sine wave output without the switching losses associated with a class A, B, or C output scheme.

In operation, at zero cross (the start of the half-cycle) all switches are off. Initially, switching element 230 is pulsed on very briefly. These pulses are filtered by inductor 234 and capacitor 236. After a brief time, switching element 230 is pulsed again but with a longer on time. The filtered voltage rises a bit higher. Subsequent cycles have a longer and longer on times, with the result of the higher output voltage. A highest output voltage is a result of the longest on time, which occurs at 90 degrees. At this point, the duty cycle is decreased, causing the output voltage to likewise decrease. As will be recognized by those skilled in the art, switching element 286 provides like operation for the negative half-cycle.

The second section, comprising switching elements 218 and 282 (along with their associated circuitry), provides the second phase of the output. As will be recognized, operation is identical to that of the first phase. The two outputs can be run together (in phase) for full power output at 100–110–120 volts, phase shifted 120 degrees for 120–208 volts (127/220), or phase shifted 180 degrees out of phase for 100/200, 110/220, 115/230, or 120/240 volt outputs.

Figure 12:
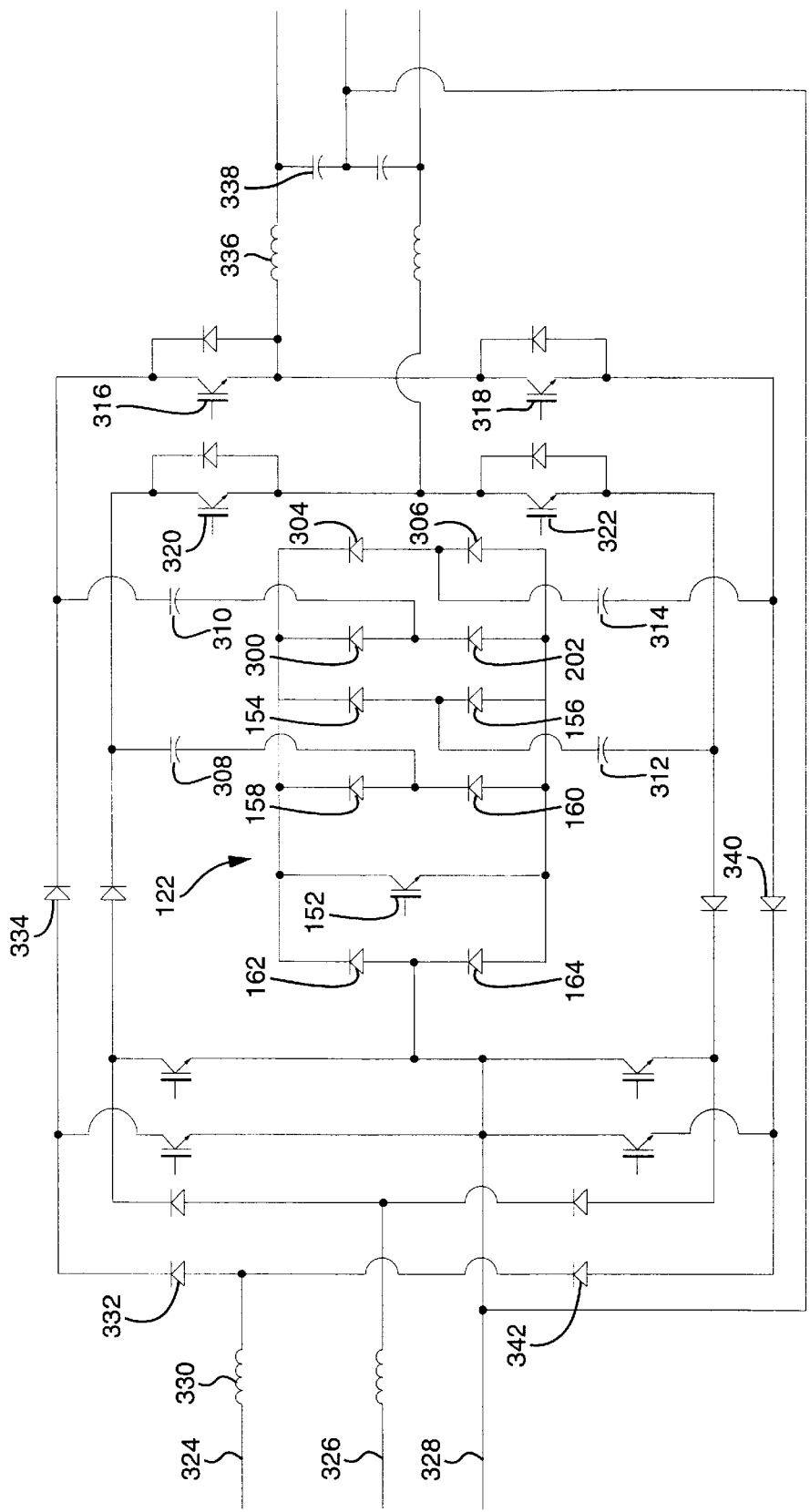
FIG. 12 is a single-line schematic diagram of a further alternate embodiment of the present invention providing split-phase topology.

FIG. 12 illustrates a further embodiment of the present invention that utilizes a double bus for split-phase operation. As will be recognized, this embodiment does not include a battery input, and is therefore used only in a high efficiency mode or in a line conditioning mode to supply output power from the utility input 324, 326. Operation of this embodiment in the high efficiency mode provides power flow from the utility line input 324, through inductor 330, through diodes 332, 334, through output switching device 316, output inductor 336 and filter capacitor 338, to neutral 328. For the negative half-cycle of the utility line voltage 324, power flow is from the neutral 328, through filter elements 338, 336, through switching element 318, diodes 340, 342, through inductor 330, and back to the line input 324. As with the embodiment discussed with respect to FIGS. 3a and 3b, output switches 316, 318 are switched at a rate equal to the utility line voltage in this high efficiency mode of operation for each respective half-cycle of the utility line voltage waveform.

It will be recognized that switching element 152 of the center switch circuitry 122 remains off during the high efficiency mode of operation. However, this switching element 152 may be pulse width modulated to provide soft charging of the DC bus capacitors 308, 310, 312, 314 so that the mode of operation of this embodiment may be switched from the high efficiency mode to the line conditioning mode without loss in output. This line conditioning mode of operation is similar to that described above for the double-conversion mode of the prior embodiments, and therefore will not be discussed here in the interests of brevity.

Figure 13:
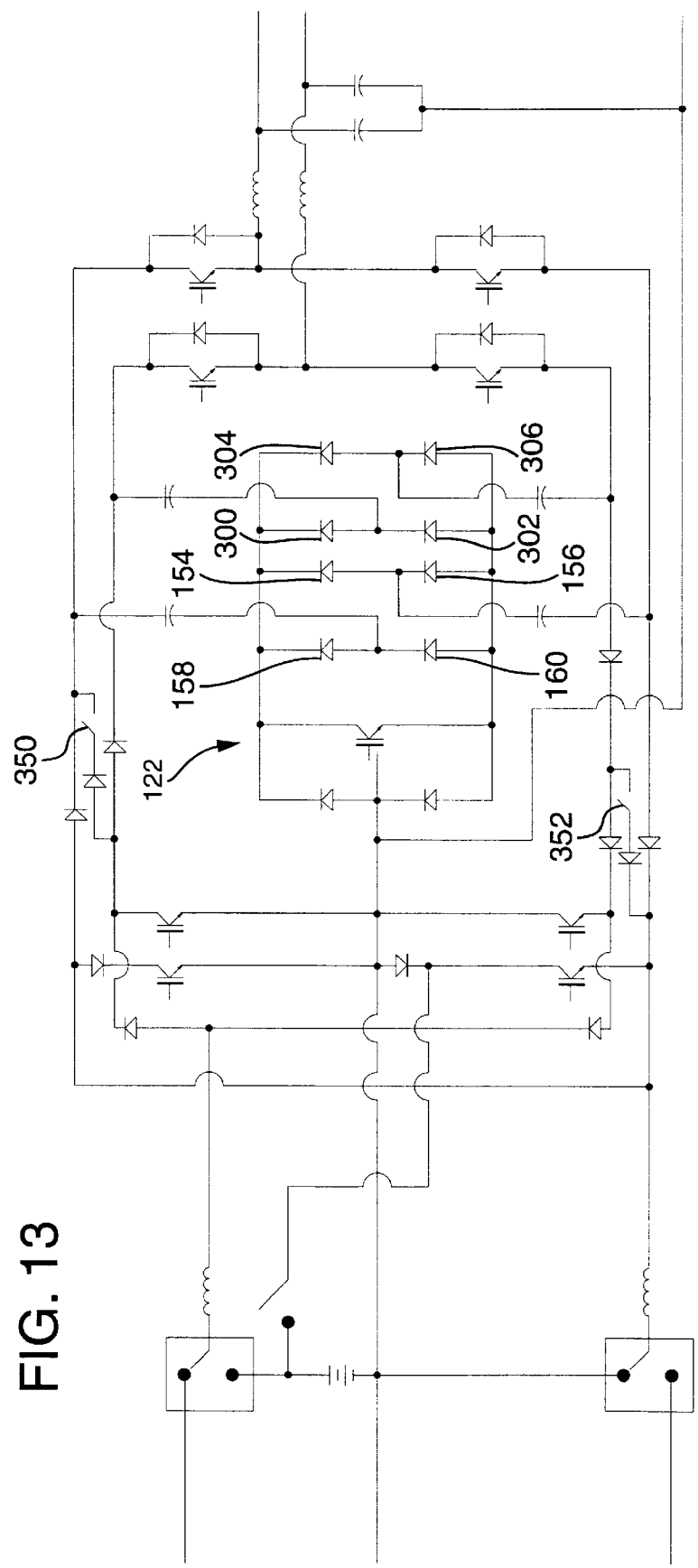
FIG. 13 is a single-line schematic diagram illustrating a further alternative embodiment of the present invention similar to the embodiment of FIG. 12 but providing boost-converter operation.

FIG. 13 illustrates yet a further embodiment of the present invention similar to that illustrated in FIG. 12, but including a boost conversion mode of operation and a battery input for full UPS functionality. Operation of this embodiment of the present invention will not be described herein as it follows from the previous discussion of the prior embodiments for each of its modes of operation. However, it is noted that this embodiment includes switching elements 350 and 352 which may be utilized for the boost conversion of the DC battery voltage. It is also noted that this embodiment includes separate diode pairs 158/160, 154/156, 300/302, and 304/306 for each of the individual DC bus capacitors 308, 312, 314, and 310.

Figure 14:
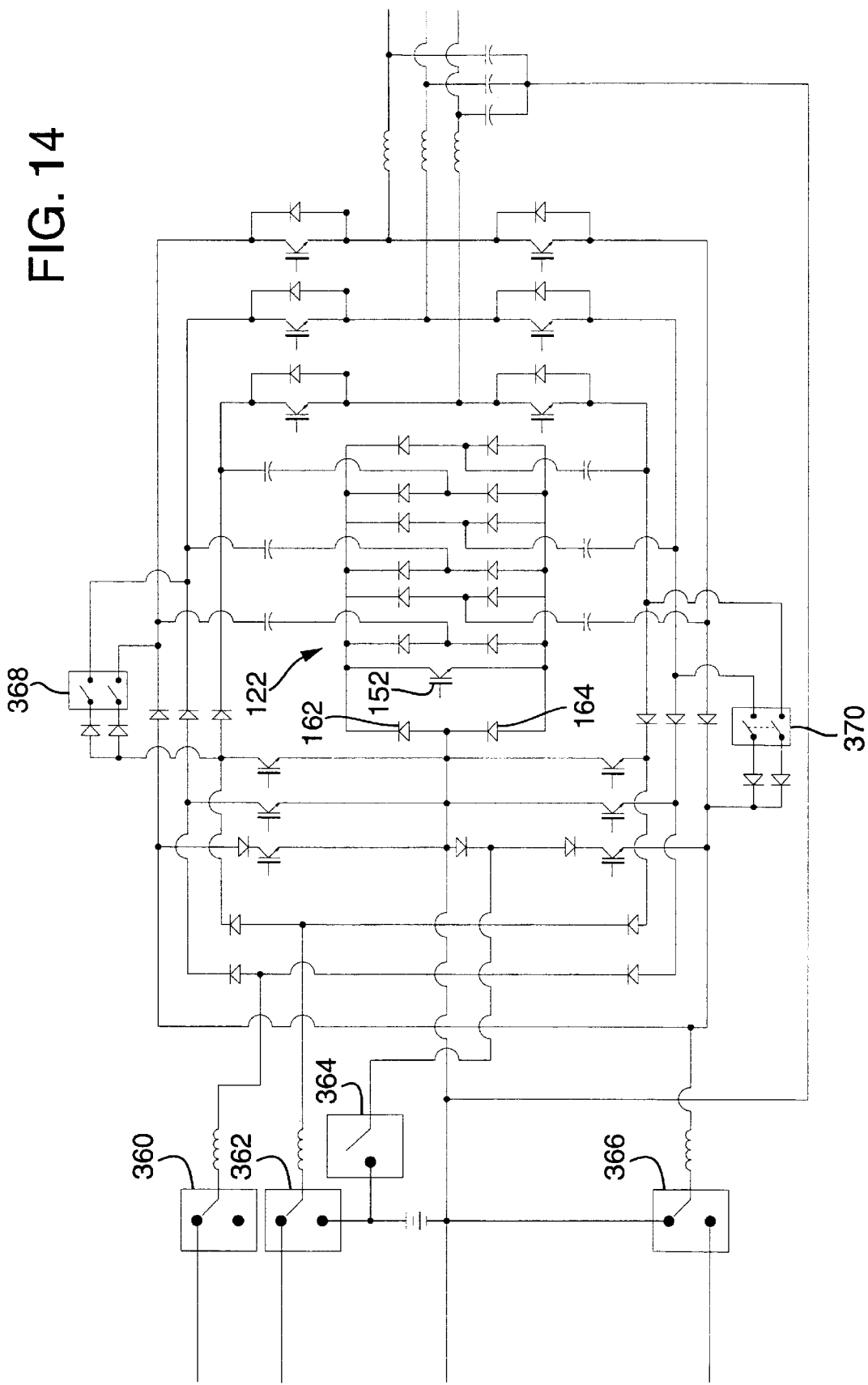
FIG. 14 is a single-line schematic diagram illustrating an alternate embodiment of the present invention providing both three-phase input and three-phase output with boost conversion.

FIG. 14 illustrates yet a further embodiment of the present invention utilizing three input phases and providing three output phases, with the capability of providing boost-converter operation for supplying the output power from the battery to provide full UPS functionality. This embodiment clearly illustrates the scalability of the present invention from single to multiple phases both on the input and the output. Operation of this circuit will be foregone in the interests of brevity and in view of the prior descriptions of the previous embodiments, whose application to this embodiment should now be recognized by those skilled in the art. As with the prior embodiment, one skilled in the art will recognize that the center switch circuitry 122 also includes in this embodiment individual diode pairs for each of the DC bus capacitors in addition to the switching element 152 and diodes 162 and 164. While switching element 152 is illustrated as an insulated gate bipolar transistor (IGBT) it should be noted that this device may utilize other devices such as mosfets, transistors, relays, etc. Also as with the previous embodiment, operation in the boost-converter mode is facilitated by the transition of relays 360, 362, 364, 366, 368, and 370.

Figure 15:
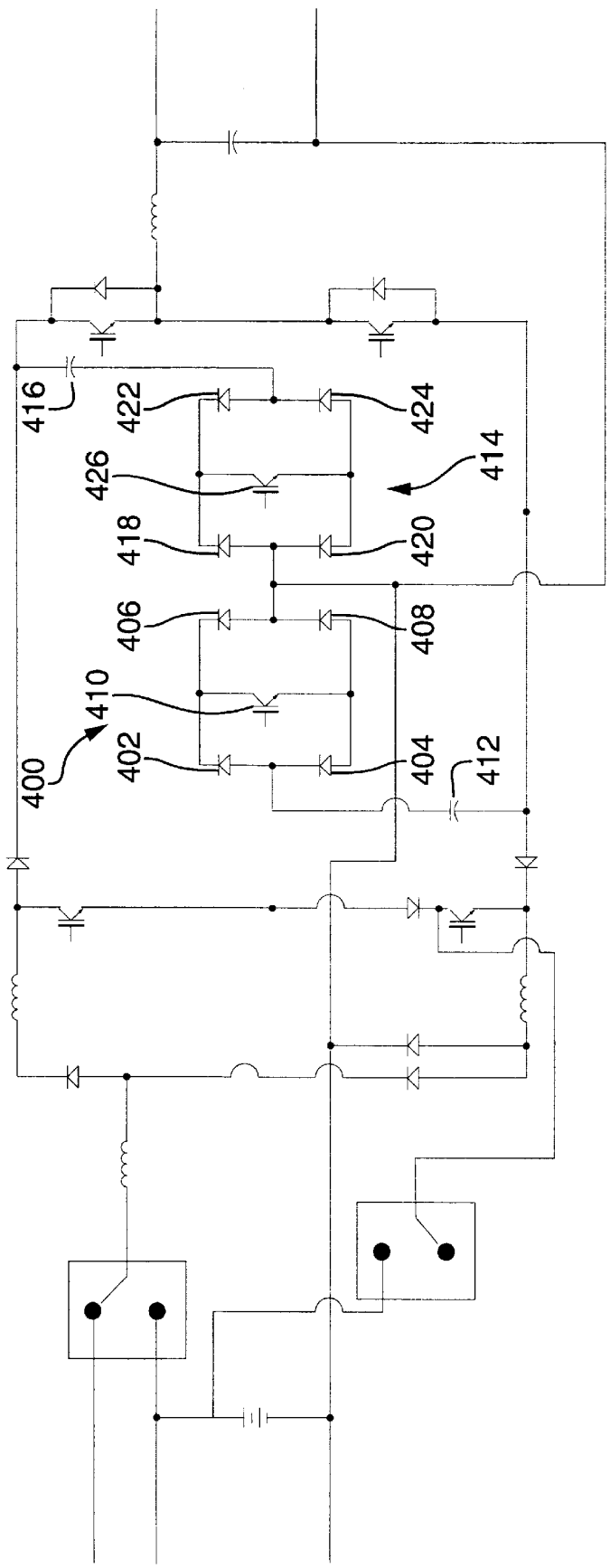
FIG. 15 is a single-line schematic diagram of a further alternate embodiment of the present invention utilizing a multiple center switch topology to provide controlled, independent utilization of the separate energy sources.

FIG. 15 illustrates a further embodiment of the present invention utilizing multiple center switches to provide individual control of the current from the separate energy sources (e.g., capacitors). As may be seen from this embodiment, center switching circuitry 400 comprising diodes 402, 404, 406, and 408, and switching element 410 provides the control of the current flow into and out of the DC bus capacitor 412. In similar fashion, center switch 414 provides individual control of DC bus capacitor 416 through diodes 418, 420, 422, and 424, in addition to switching element 426. Operation of this embodiment of the present invention is similar to that described above, and provides operation in each of the UPS modes previously described.

Figure 16:
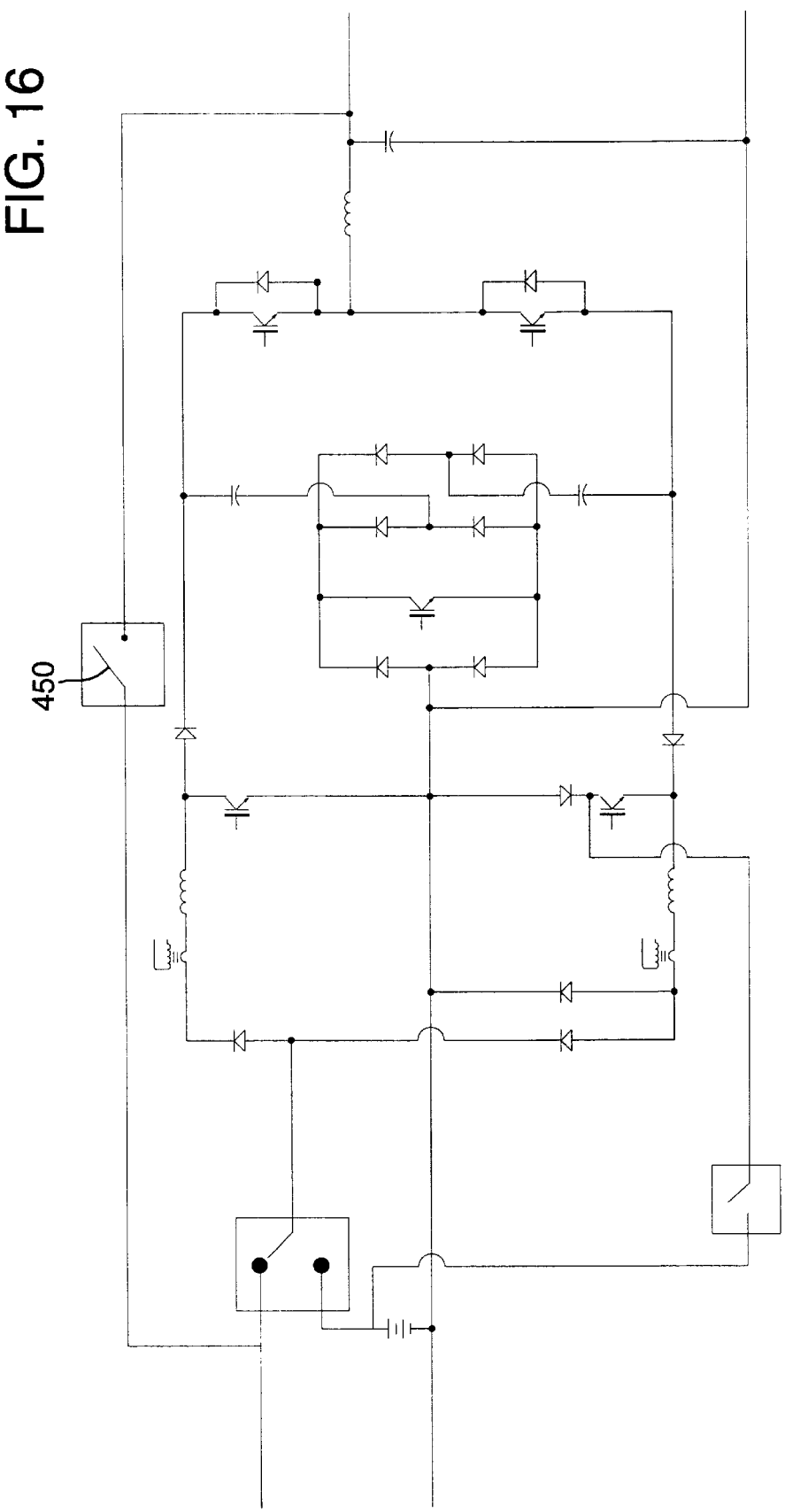
FIG. 16 is a single-line schematic diagram illustrating a further alternate embodiment of the present invention providing a single phase output.

FIG. 16 illustrates a further embodiment of the present invention providing full UPS operability in a similar manner to those embodiments described above. In this embodiment, a relay 450 is added to provide a bypass mode of operation. This relay is closed to allow the UPS to operate in the bypass mode to provide true n+1 redundancy operation or multiple module operation where the output of the modules are running in parallel. If one of the modules fails and overloads a second good module, the relay 450 is closed on the good or properly operating module to prevent propagation of the failure to the good module. The module operates in this mode until the bad module is isolated. It should be recognized by those skilled in the art that such a bypass relay 450 may be incorporated in the various other embodiments of the invention as desired. Operation in the other modes are as described above with the prior embodiments.

While all of the previous embodiments utilize a topology for the center switching circuit 122 which was fairly consistent, other embodiments of this center switching circuitry are within the scope of the present invention. Additionally, the center switch circuitry of the present invention may be applicable to other power conversion devices that contain an energy storage device, such as the DC bus capacitors described above. The applicability of such a center switch is particularly acute in any topology that requires the power path to be interrupted from the power storage devices, for example to limit the energy for a fault condition or otherwise isolate the power storage devices from the circuit.

In addition to the embodiments of the center switch circuit described and illustrated above, FIG. 17 presents an alternate embodiment for this circuitry applied to a basic two capacitor bus topology, which is common in most multi-conversion UPS systems. In such systems, such as those described above and others, power to charge the capacitors and power from the capacitors is from the positive and negative DC busses, common to the neutral. In this FIG. 17, a center switch capacitor isolation topology is utilized having only two diodes 452 and 454 with a switching element 456. The power flow in this embodiment is such that when the switch is open, the bus capacitors 458, 460 each charge from the positive and negative busses, through diodes 452 and 454 to neutral. If power is to be drawn from the capacitors 458, 460, the diodes effectively block current flow, effectively isolating the capacitors from the circuit. If the switching element 456 is closed, the positive (or negative) discharge path is from neutral, through diode 454 (or diode 452 for the negative discharge), through capacitor 458 (460) into the positive (or negative) bus. One particular advantage, to this topology is the very low voltage drops throughout the system, and the small number of components required.

Figure 18:
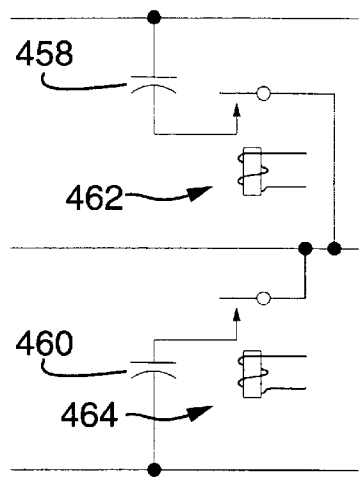
FIG. 18 is a partial single-line diagram illustrating an further alternate embodiment of the center switch circuitry of the present invention.
Figure 19:
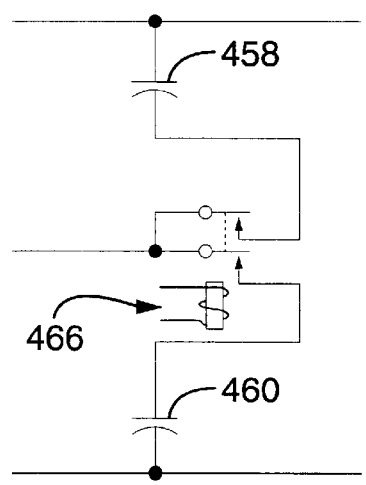
FIG. 19 is a partial single-line diagram illustrating an alternate embodiment of the center switch circuitry of the present invention.

FIGS. 18 and 19 illustrate alternate topologies of the center switching circuit that utilize relays, either individual relays 462 and 464 illustrated in FIG. 18 or a common relay 466 illustrated in FIG. 19. In either of these topologies, with the relay open the capacitors are out of the circuit. Closing the relay includes the capacitor in the circuit. The prime advantage of such a topology for the center switch circuit is that there is almost no power lost through the switching device. The voltage drop across the contacts of the relays is nearly negligible, however the coil wattage does utilize additional power. Since mechanical relays typically take 7 to 25 milliseconds to actuate, during which time the capacitors are not available to supply power, this topology may find best applicability where such response delays are tolerable.

Figure 20:
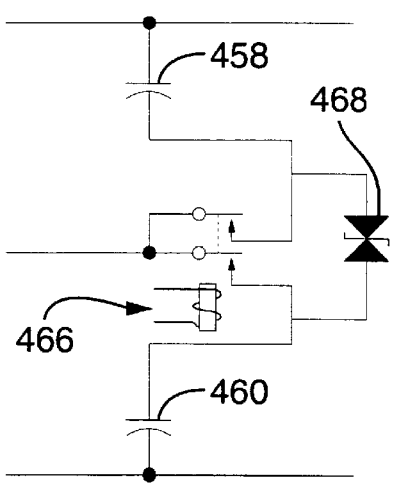
FIG. 20 is a partial single-line diagram illustrating an additional alternate embodiment of the center switch circuitry of the present invention.

FIG. 20 illustrates a further embodiment of the center switching circuitry of the present invention that utilizes an additional bidirectional Zener clamping device 468, which conducts at a given voltage. The purpose of this device 468 is to allow the capacitors 458, 460 to accept transient energy spikes that exceed the normal bus voltage. For example, if the bus was charged to +/−200 volts (400 volts included), the additional of a 250 volt bi-directional Zener diode 468 would allow the capacitors 458, 460 to remain disconnected at the normal bus voltage, but come into play if a surge greater than 250 volts were impressed on the bus lines. As will be recognized by those skilled in the art, the inclusion of this bidirectional device 468 may be included to any topology of the center switch circuit where such functionality is desired.

Figure 21:
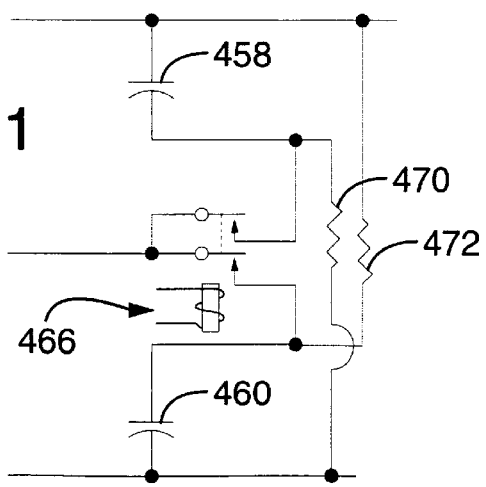
FIG. 21 is a partial single-line diagram illustrating an alternate embodiment of the center switch circuitry of the present invention.

FIG. 21 illustrates the addition of pre-charging resistors 470, 472 to the relay topology of FIG. 19. The purpose of these resistors is to allow the capacitors 458, 460 to be (slowly) brought up to charge in a controlled-current manner. It will be recognized by those skilled in the art that the time constant provided by this circuitry is an exponential function, directly proportional to the instantaneous current. Therefore, the capacitors are made available to supply power after a brief, calculable period of charge. As with the above, the addition of these pre-charge resistors are not limited to the relay embodiment illustrated in this figure, but may be utilized in any topology where such controlled current charging is desired.

Figure 17:
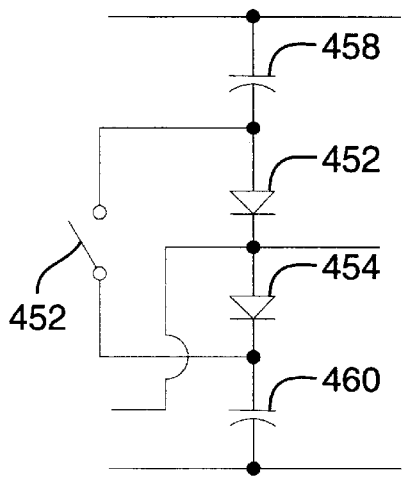
FIG. 17 is a partial single-line diagram illustrating an alternate embodiment of the center switch circuitry of the present invention.
Figure 22:
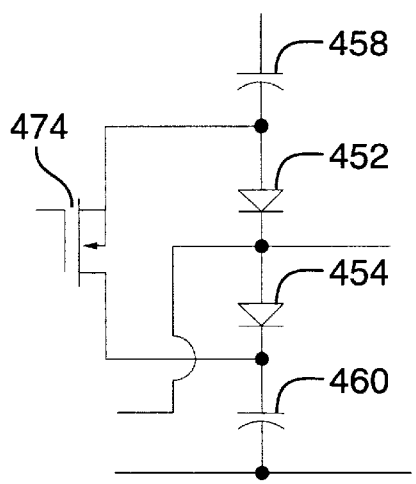
FIG. 22 is a partial single-line diagram illustrating a further alternate embodiment of the center switch circuitry of the present invention.
Figure 23:
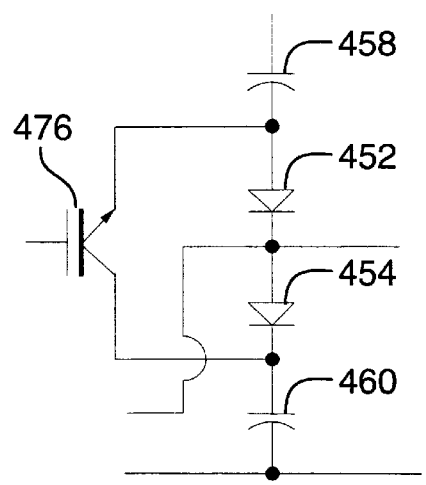
FIG. 23 is a partial single-line diagram illustrating an alternate embodiment of the center switch circuitry of the present invention.

FIG. 22 is identical in theory to the embodiment of the center switch circuit illustrated in FIG. 17 with the switching element 456 being replaced by a MOSFET transistor. The advantage of utilizing such a device as that illustrated in FIG. 22 over mechanical means lies in the speed of the MOSFET, which is essentially instantaneous. This allows the capacitors to connect with no time lag, meaning that there is no time when the load is without available power. Additionally, the MOSFET 474 can be modulated by a rapid series of ever widening pulses, allowing a controlled charge to be applied to the capacitors. FIG. 23 provides a similar topology with the replacement of the MOSFET 474 with an IGBT 476. The advantage presented by this embodiment is the lower power loss through the IGBT 476 than with the MOSFET 474.

Figure 24:
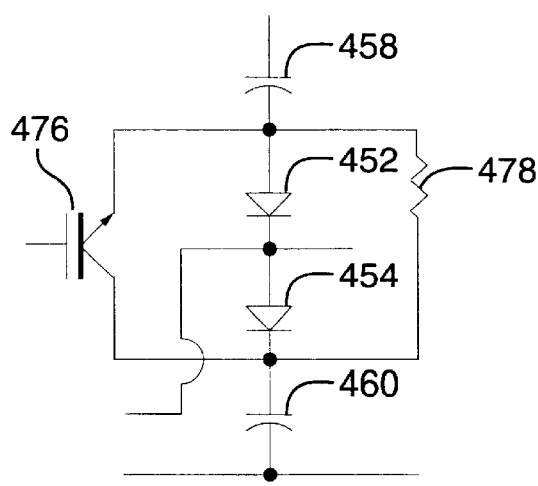
FIG. 24 is a partial single-line diagram illustrating an additional alternate embodiment of the center switch circuitry of the present invention.
Figure 25:
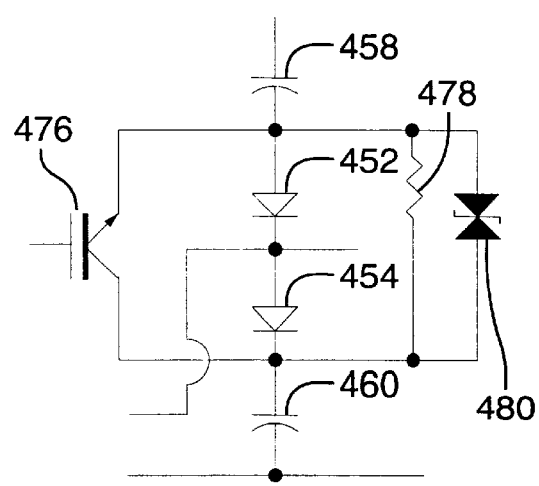
FIG. 25 is a partial single-line diagram illustrating an alternate embodiment of the center switch circuitry of the present invention.

FIG. 24 presents the embodiment of FIG. 23 with the addition of a soft charge resistor 478. As described above, the addition of this soft charge resistor 478 allows the soft charging of the capacitors 458, 460 through a known time constant function. FIG. 25 adds the addition of the bi-directional Zener device 480 to the embodiment of FIG. 24 to provide the functionality described above associated with the use of such a device.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An inverter, comprising:
    an input for receiving electric power from an external source of electric power;
    a return line to which the external source of electric power is referenced;
    an output for supplying electric power to a connected load;
    a first and a second bus coupled to the input;
    a pair of output switching elements operable to selectively couple the first and the second bus to the output;
    a pair of energy storage devices coupled between each of the first and the second bus and the return line;
    a center switch circuit interposed between the pair of energy storage devices and the return line; and
    a controller operatively coupled to the pair of output switching elements and the center switch circuit for controlling a state thereof; and
    wherein the center switch circuit is operable to selectively enable and disable power flow from the energy storage devices to the first and the second bus.

2. The inverter of claim 1, wherein the controller opens the center switch circuit to prevent power flow from the energy storage devices to the first and second bus and controls the pair of output switching elements to couple the first and second bus to the output thereby enabling operation of the inverter in a high efficiency mode whereby electric power from the external source of electric power is delivered to the connected load essentially without compensation thereof.

3. The inverter of claim 2, wherein the controller selectively opens and closes the pair of output switches at a rate equal to a frequency of the electric power from the external source of electric power.

4. The inverter of claim 2, wherein center switch circuit is configured to selectively associate and disassociate a connection from the pair of energy storage devices to the return line, and wherein the controller modulates the center switch circuit to controllably charge the pair of energy storage devices.

5. The inverter of claim 1, wherein the controller closes the center switch circuit to enable operation in a double-conversion mode whereby the controller modulates the pair of output switching elements to construct a voltage waveform on the output from energy stored in the pair of energy storage devices.

6. The inverter of claim 5, wherein the controller opens the center switch circuit to prevent energy transfer from the energy storage devices to the output.

7. The inverter of claim 1, further comprising:
    a pair of input switches controllable by the controller and coupled between the first and second bus and the return line;
    an input inductor interposed between the input and the first and second bus; and
    wherein the controller opens the center switch circuit and selectively closes one of the pair of input switches to charge the input inductor; and wherein thereafter the controller closes the center switch circuit and opens the one of the pair of input switches to charge one of the pair of energy storage devices.

8. The inverter of claim 7, wherein the controller opens the center switch circuit and selectively closes the other of the pair of input switches to charge the input inductor, and wherein thereafter the controller closes the center switch circuit and opens the closed input switch to charge the other of the pair of energy storage devices.

9. The inverter of claim 7 wherein the external source of electric power includes a source of DC power and a source of AC power, the inverter further comprising an input select circuit operable to selectively couple one of the source of DC power and the source of AC power to the input.

10. The inverter of claim 9, further comprising a third input switch coupled to the source of DC power and a second input inductor coupled between the third input switch and the return line, and wherein the controller opens the center switch circuit and closes the third input switch to charge the second input inductor, and wherein thereafter the controller closes the center switch circuit and opens the third input switch to charge the other of the pair of energy storage devices.

11. The inverter of claim 1, wherein the input comprises a plurality of input lines for receiving electric power from a multiphase external source of electric power.

12. The inverter of claim 1, wherein the pair of output switching elements comprises a plurality of output switching elements, wherein the output comprises a plurality of output lines for supplying a plurality of phases of electric power to the connected load, and wherein the plurality of pairs of output switching elements are operable to selectively couple the first and second bus to the plurality of output lines.

13. The inverter of claim 1, further comprising:
a third and fourth bus coupled to the input;
a second pair of energy storage devices coupled between each of the third and fourth bus and the return line;
a second output;
a second pair of output switching elements operable to selectively couple the third and fourth bus to the second output; and
wherein the center switch circuit is interposed between the second pair of energy storage devices and the return line.

14. The inverter of claim 1, wherein the center switch circuit comprises a first and a second center switch circuit coupled to one of the pair of energy storage devices to individually selectively enable and disable power flow.

15. The inverter of claim 1, wherein the center switch circuit comprises:
a switching element having a first and a second connection and a control input coupled to the controller;
a first series coupled pair of diodes coupled across the first and second connection of the switching element, the first series coupled pair of diodes having a first node therebetween coupled to the return line;
a second series coupled pair of diodes coupled across the first and second connection of the switching element, the second series coupled pair of diodes having a second node therebetween coupled to one of the pair of energy storage devices; and
a third series coupled pair of diodes coupled across the first and second connection of the switching element, the third series coupled pair of diodes having a third node therebetween coupled to the other of the pair of energy storage devices.

16. The inverter of claim 15, wherein the center switch further comprises a bi-directional clamping device coupled between the second and the third nodes.

17. The inverter of claim 15, wherein the center switch further comprises a first resistor coupled between the second node and the first bus, and a second resistor coupled between the third node and the second bus.

18. The inverter of claim 15, wherein the center switch further comprises:
a bi-directional clamping device coupled between the second and the third nodes;
a first resistor coupled between the second node and the first bus; and
a second resistor coupled between the third node and the second bus.

19. The inverter of claim 1, wherein the center switch circuit comprises:
a series coupled pair of diodes having a first end coupled to one of the pair of energy storage devices, and a second end coupled to the other of the pair of energy storage devices, the series coupled pair of diodes having a node therebetween coupled to the return line; and
a switching element having a first terminal coupled to one of the pair of energy storage devices and a second terminal coupled to the other of the pair of energy storage devices.

20. The inverter of claim 19, further comprising a resistor coupled across the series coupled pair of diodes.

21. The inverter of claim 20, further comprising a bi-directional clamping device coupled across the series coupled pair of diodes.

22. The inverter of claim 1, wherein the center switching circuit comprises a switching element interposed between the pair of energy storage devices and the return line.

23. In an inverter having an input for receiving electric power from an external source of electric power, a return line to which the source of electric power is referenced, an output for supplying electric power to a connected load, a positive and a negative bus coupled to the input, a pair of output switches operable to selectively provide power from the positive and the negative bus to the output, a pair of bus capacitors coupled between the buses and the return line, a controller operatively coupled to the output switches for controlling a state thereof, a center switch circuit interposed between the bus capacitors and the return line and operable to selectively enable and disable power flow from the capacitors to the positive and negative buses, the center switch circuit comprising:
a switching element having a first and a second connection and a control input coupled to the controller;
a first series coupled pair of diodes coupled across the first and second connection of the switching element, the first series coupled pair of diodes having a first node therebetween coupled to the return line;
a second series coupled pair of diodes coupled across the first and second connection of the switching element, the second series coupled pair of diodes having a second node therebetween coupled to one of the bus capacitors; and
a third series coupled pair of diodes coupled across the first and second connection of the switching element, the third series coupled pair of diodes having a third node therebetween coupled to the other bus capacitor.

24. The circuit of claim 23, wherein the center switch further comprises a bidirectional clamping device coupled between the second and the third nodes.

25. The inverter of claim 23, wherein the center switch further comprises a first resistor coupled between the second node and the positive bus, and a second resistor coupled between the third node and the negative bus.

26. The inverter of claim 23, wherein the center switch further comprises:
   a bidirectional clamping device coupled between the second and the third nodes;
   a first resistor coupled between the second node and the positive bus; and
   a second resistor coupled between the third node and the negative bus.

27. An uninterruptible power supply (UPS) for supplying AC power to a connected load from an external source of utility line voltage, the UPS providing power to the connected load during periods of normal utility line voltage, periods of abnormal utility line voltage, and periods of loss of utility line voltage in a high efficiency mode, a double-conversion mode, and a DC boost mode, respectively, comprising:
   an input adapted to receive utility line voltage;
   an inverter having a positive and a negative bus and a pair of output switches, the inverter selectively coupling the positive and negative bus to the connected load by controlling a state of the pair of output switches, the inverter further having a pair of bus capacitors coupled to the positive and the negative bus and a center switch circuit, the center switch circuit selectively enabling and disabling power flow from the bus capacitors to the positive and negative bus;
   a battery; and
   an input select circuit operable to selectively couple the external utility line voltage and the battery to the inverter.

28. The UPS of claim 27, wherein the center switch circuit is configured to further selectively enable and disable power flow from the positive and the negative bus to the bus capacitors.

29. The UPS of claim 28, further comprising an input inductor and a pair of input switches, the input switches alternatively closing to charge the input inductor, and wherein upon charging of the input inductor the input switches are opened and the center switch circuit is closed to allow power flow into the bus capacitors.

30. The UPS of claim 29, wherein the output switches are pulse-width modulated to create an output voltage to the connected load from energy stored in the bus capacitors.

31. The UPS of claim 30, wherein the center switch circuit is opened to prevent power flow from the bus capacitors into a fault condition.

32. The UPS of claim 29, wherein the input select circuit selects the battery in a DC boost mode and the utility line voltage in a boost-conversion mode.

33. The UPS of claim 27, wherein the center switch circuit disables power flow from the capacitors to the positive and negative bus during a high efficiency mode of operation, the inverter closing the pair of output switches to allow utility line voltage to be supplied to the connected load essentially without compensation.

34. The UPS of claim 33, wherein the inverter opens and closes the output switches at a frequency of the utility line voltage to alternatively couple the positive and the negative bus to the connected load.

35. The UPS of claim 27, wherein the center switch circuit comprises steering diodes associated with each bus capacitor, a switching device, and steering diodes associated with the return, whereby power flow into and out of the bus capacitors is prohibited when the switching device is open.

* * * * *

UNITED STATES PATENT AND TRADEMARK OFFICE
CERTIFICATE OF CORRECTION

PATENT NO. : 6,266,260 B1  Page 1 of 1
DATED : July 24, 2001
INVENTOR(S) : Donald K. Zahrte, Sr. et al.

It is certified that error appears in the above-identified patent and that said Letters Patent is hereby corrected as shown below:

Title page,
Delete Related U.S. Application Data and all reference to this provisional application.

Signed and Sealed this

Twenty-second Day of January, 2002

*Attest:*

JAMES E. ROGAN
*Attesting Officer*    *Director of the United States Patent and Trademark Office*